United States Patent
Kim et al.

(10) Patent No.: US 10,547,686 B2
(45) Date of Patent: Jan. 28, 2020

(54) DISPLAY APPARATUS AND CONTROL METHOD THEREOF

(71) Applicant: SAMSUNG ELECTRONICS CO., LTD., Suwon-si (KR)

(72) Inventors: Seung-eon Kim, Gwangmyeong-si (KR); Himanshu Anand, Suwon-si (KR); Se-hee Kang, Hwaseong-si (KR); Dong-hwan Kim, Suwon-si (KR); Tae-woon Jeong, Suwon-si (KR); Pepalavenkata Sunil, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 73 days.

(21) Appl. No.: 15/890,741

(22) Filed: Feb. 7, 2018

(65) Prior Publication Data
US 2018/0248956 A1 Aug. 30, 2018

(30) Foreign Application Priority Data
Feb. 24, 2017 (KR) ........................ 10-2017-0024551

(51) Int. Cl.
*H04L 29/06* (2006.01)
*H04L 29/08* (2006.01)
*H04N 21/414* (2011.01)
*G06Q 30/02* (2012.01)
*H04N 21/482* (2011.01)
*H04N 21/4227* (2011.01)

(52) U.S. Cl.
CPC ....... *H04L 67/125* (2013.01); *G06Q 30/0241* (2013.01); *H04N 21/41415* (2013.01); *H04N 21/4227* (2013.01); *H04N 21/4825* (2013.01)

(58) Field of Classification Search
CPC .................................................... H04L 67/125
See application file for complete search history.

(56) References Cited

U.S. PATENT DOCUMENTS

| | | | |
|---|---|---|---|
| 8,589,991 B2 * | 11/2013 | Hassan | .................... H04B 1/69 725/81 |
| 8,898,255 B2 | 11/2014 | Kim et al. | |
| 2007/0136133 A1 | 6/2007 | Li | |
| 2011/0214148 A1 * | 9/2011 | Gossweiler, III | .... H04N 21/235 725/46 |
| 2011/0282727 A1 | 11/2011 | Phan et al. | |
| 2012/0114336 A1 | 5/2012 | Kim et al. | |

* cited by examiner

*Primary Examiner* — Adnan M Mirza
(74) *Attorney, Agent, or Firm* — Sughrue Mion, PLLC

(57) ABSTRACT

A display apparatus having a communicator configured to communicate with an external device; a display; and a controller configured to receive schedule information about reproduction of a plurality of pieces of content from the external device, determine whether second content to be reproduced following first content is completely downloadable until a reproducing completion time of the first content based on the received schedule information, download the second content while reproducing the first content if it is determined that the second content is completely downloadable, and start downloading the second content instead of reproducing first content if it is determined that the second content is not completely downloadable.

19 Claims, 17 Drawing Sheets

DISPLAY APPARATUS AND CONTROL METHOD THEREOF

CROSS-REFERENCE TO RELATED THE APPLICATION

This application claims priority from Korean Patent Application No. 10-2017-0024551 filed on Feb. 24, 2017 in the Korean Intellectual Property Office, the disclosure of which is incorporated herein by reference.

BACKGROUND

Field

Apparatuses and methods consistent with exemplary embodiments relate to a display apparatus and a control method thereof, and more particularly, to a display apparatus for downloading a plurality of pieces of content, and a control method of controlling the same.

Description of Related Art

A digital signage refers to an advertising display that displays or projects an image or information on a screen through a digital technique, and is also called a large format display (LFD).

The digital signage is remotely controllable through a network, downloads content such as an advertisement image, an exhibition image or the like from a server or other external devices, and reproduces the content in accordance with predetermined schedules. In this case, the digital signage analyzes a schedule file distributed from the server, downloads pieces of content one by one, and starts reproducing the content in accordance with the schedules when all the pieces of content are completely downloaded. In other words, when all the pieces of content are transferred to the display apparatus and are buffered or stored therein and as such, are ready for reproduction on the display apparatus.

Since the digital signage reproduces the content only after downloading all the pieces of content, it is inconvenient for a user to wait for a long time until the content starts being reproduced. For example, if the first content and the second content are scheduled to be reproduced in sequence, the first content may be not immediately reproduced according to the schedules but may be delayed since the second content starts to be downloaded after the first content is completely downloaded.

Further, if a network environment and/or network connection is poor, much more time is required to reproduce the content and therefore it may be misunderstood that there is an error in communicating with the server. In this case, a more efficient downloading strategy is needed.

SUMMARY

Accordingly, an aspect of one or more exemplary embodiments broadly relates to a display apparatus, which can shorten the time required from downloading the content to reproducing a plurality of pieces of content, and a control method of controlling the same.

Further, another aspect of one or more exemplary embodiments broadly relates to a display apparatus, which can selectively use many strategies for downloading a plurality of pieces of content and offer the most efficient downloading method, and a control method of controlling the same.

According to an exemplary embodiment, there is provided a display apparatus comprising: a communicator configured to communicate with an external device; a display; and a controller configured to receive schedule information about reproduction of a plurality of pieces of content from the external device, determine whether second content to be reproduced following first content is completely downloadable until a reproducing completion time of the first content among the plurality of pieces of content based on the received schedule information, download the second content while reproducing the first content if it is determined that the second content is completely downloadable, and start downloading the second content instead of reproducing first content if it is determined that the second content is not completely downloadable.

According to an exemplary embodiment, it is possible to shorten time taken from downloading up to reproducing in terms of downloading the plurality of pieces of content. Further, the most efficient downloading method is provided by selectively using various strategies.

The controller may determine whether the first content is completely downloadable during a first section set for reproducing the first content based on the schedule information when the schedule information is received, and may download the first content during the first section if the first content is completely downloadable, but may download the second content during the first section if the first content is not completely downloadable. Thus, it is determined whether to start the downloading by determining the downloading completion time of the content to be first reproduced, thereby preventing an inefficient downloading operation.

The controller may reproduce default content previously set instead of the first content during the first section if the first content is not completely downloadable during the first section based on the schedule information. Thus, substitute content is provided when the content is not reproducible according to the set schedule.

The controller may determine whether the second content and third content to be reproduced following the second content are completely downloadable until the reproducing completion time of the first content based on the schedule information, and may simultaneously or sequentially download the second content and the third content while reproducing the first content if it is determined that the second content and the third content are completely downloadable. Thus, the pieces of content to be subsequently reproduced are downloaded concurrently with reproducing the current content as scheduled, thereby reproducing time taken up to the reproduction.

The controller may determine at least one piece of content completely downloadable among the plurality of pieces of content set to be subsequently reproduced in sequence until the reproducing completion time of the first content based on the schedule information, and may download the at least one piece of content while reproducing the first content. Thus, order of downloading the pieces of content to be subsequently reproduced while the current content is reproduced as scheduled is changed in terms of the downloading, thereby shortening time taken up to the reproduction.

The schedule information may comprise information about reproduction channels comprising the plurality of pieces of content, at least one frame set according to the reproduction channels, content types, and a reproduction section set for each of the plurality of pieces of content. Thus, the schedule file distributed from the server or the external device is analyzed to download and reproduce the plurality of pieces of content according to the reproduction channels and frames.

The controller may reproduce the plurality of pieces of content on the display according to set schedules based on the information about the reproduction channel. Thus, the schedule file distributed from the server or the external device is analyzed to download and reproduce the pieces of content set with regard to the reproduction channel.

The controller may display an area corresponding to each of at least one frame on the display based on information about frames according to the reproduction channels, and may reproduce at least one piece of content set with regard to a corresponding frame in each area. Thus, the schedule file distributed from the server or the external device is analyzed to download the pieces of content set with regard to the plurality of frames and simultaneously reproduce them on one screen.

The content type may comprise at least one among single content, a content playlist, and combination content in which various types of content are combined. Thus, downloading strategies according to the exemplary embodiment are applied to various types of content.

According to an exemplary embodiment, there is provided a method of controlling a display apparatus, the method comprising: receiving schedule information about reproduction of a plurality of pieces of content from the external device; determining whether second content to be reproduced following first content is completely downloadable until a reproducing completion time of the first content among the plurality of pieces of content based on the received schedule information; downloading the second content while reproducing the first content if it is determined that the second content is completely downloadable; and starting downloading the second content instead of reproducing first content if it is determined that the second content is not completely downloadable.

According to an exemplary embodiment, it is possible to shorten time taken from downloading up to reproducing in terms of downloading the plurality of pieces of content. Further, the most efficient downloading method is provided by selectively using various strategies.

The method may further comprise: determining whether the first content is completely downloadable during a first section set for reproducing the first content based on the schedule information when the schedule information is received; and downloading the first content during the first section if the first content is completely downloadable, but downloading the second content during the first section if the first content is not completely downloadable. Thus, it is determined whether to start the downloading by determining the downloading completion time of the content to be first reproduced, thereby preventing an inefficient downloading operation.

The method may further comprise reproducing default content previously set instead of the first content during the first section if the first content is not completely downloadable during the first section based on the schedule information. Thus, substitute content is provided when the content is not reproducible according to the set schedule.

The method may further comprise: determining whether the second content and third content to be reproduced following the second content are completely downloadable until the reproducing completion time of the first content based on the schedule information, and simultaneously or sequentially downloading the second content and the third content while reproducing the first content if it is determined that the second content and the third content are completely downloadable. Thus, the pieces of content to be subsequently reproduced are downloaded concurrently with reproducing the current content as scheduled, thereby reproducing time taken up to the reproduction.

The method may further comprise determining at least one piece of content completely downloadable among the plurality of pieces of content set to be subsequently reproduced in sequence until the reproducing completion time of the first content based on the schedule information; and downloading the at least one piece of content while reproducing the first content. Thus, order of downloading the pieces of content to be subsequently reproduced while the current content is reproduced as scheduled is changed in terms of the downloading, thereby shortening time taken up to the reproduction.

The schedule information may comprise information about reproduction channels comprising the plurality of pieces of content, at least one frame set according to the reproduction channels, content types, and a reproduction section set for each of the plurality of pieces of content. Thus, the schedule file distributed from the server or the external device is analyzed to download and reproduce the plurality of pieces of content according to the reproduction channels and frames.

The method may further comprise reproducing the plurality of pieces of content on the display according to set schedules based on the information about the reproduction channel. Thus, the schedule file distributed from the server or the external device is analyzed to download and reproduce the pieces of content set with regard to the reproduction channel.

The method may further comprise: displaying an area corresponding to each of at least one frame on the display based on information about frames according to the reproduction channels; and reproducing at least one piece of content set with regard to a corresponding frame in each area. Thus, the schedule file distributed from the server or the external device is analyzed to download the pieces of content set with regard to the plurality of frames and simultaneously reproduce them on one screen.

The content type may comprise at least one among single content, a content playlist, and combination content in which various types of content are combined. Thus, downloading strategies according to the exemplary embodiment are applied to various types of content.

BRIEF DESCRIPTION OF THE DRAWINGS

The above and/or other aspects will become apparent and more readily appreciated from the following description of exemplary embodiments, taken in conjunction with the accompanying drawings. Understanding that these drawings depict only exemplary embodiments and are not therefore to be considered to be limiting of the scope of the disclosure, the principles herein are described and explained with additional specificity and detail through the use of the accompanying drawings, in which.

DETAILED DESCRIPTION OF EXEMPLARY EMBODIMENTS

Hereinafter, exemplary embodiments will be described in detail with reference to accompanying drawings so as to be easily materialized by a person having ordinary knowledge in the art to which the exemplary embodiments pertain. The present disclosure may be achieved in various forms and not limited to the following exemplary embodiments. For clear description, like numerals refer to like elements throughout.

Figure 1:
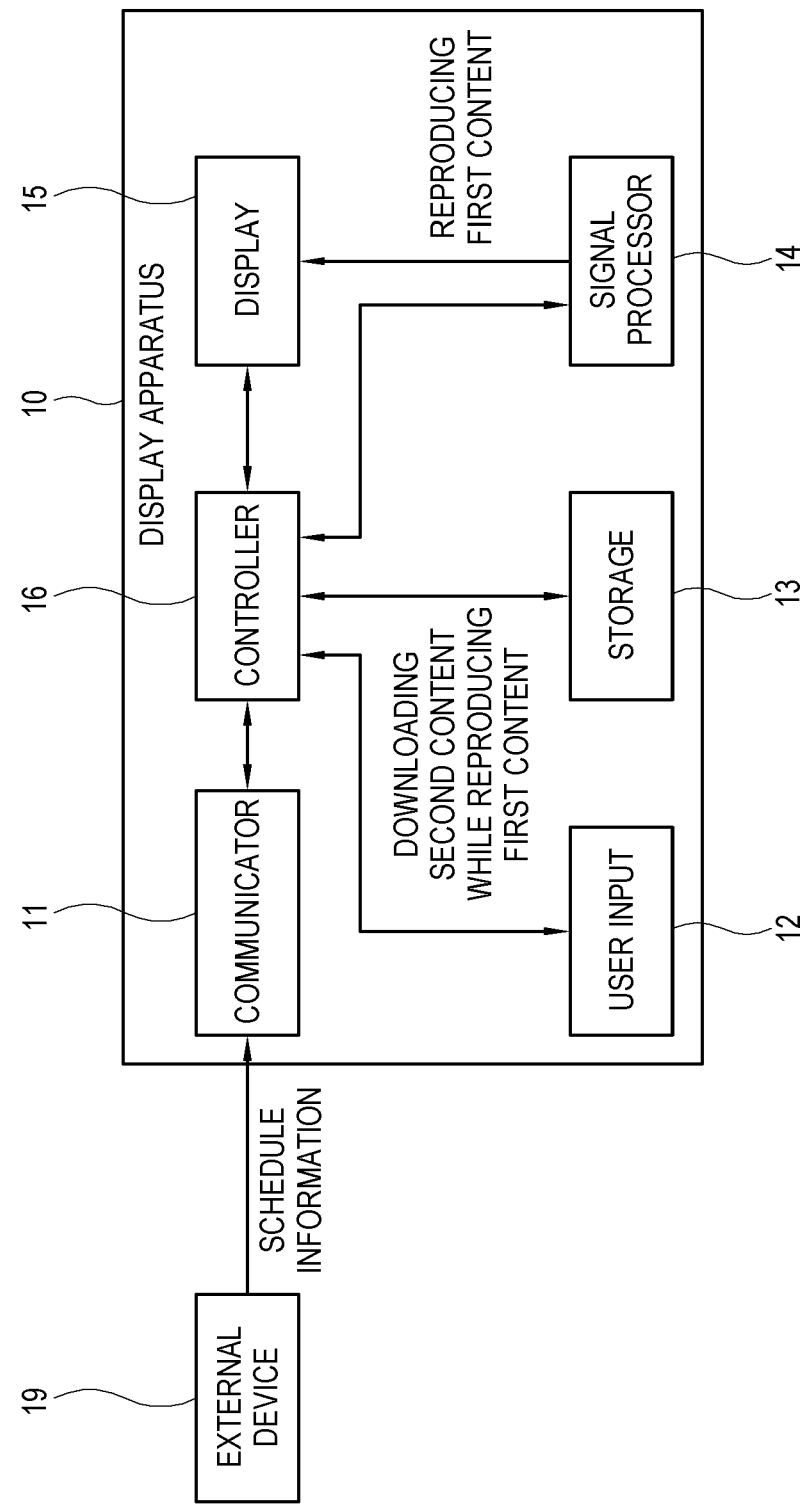
FIG. 1 is a block diagram of a display apparatus according to an exemplary embodiment.

Below, features and exemplary embodiments of a display apparatus 10 will first be described with reference to FIG. 1 to FIG. 6. FIG. 1 is a block diagram of a display apparatus according to an exemplary embodiment. As shown in FIG. 1, a display apparatus 10 according to an exemplary embodiment includes a communicator 11, a user input 12, a storage 13, a signal processor 14, a display 15 and a controller 16, and is for example materialized by a large format display (LFD) to be used as an electronic display board for advertisement, a display for exhibition, etc. The display apparatus 10 according to an exemplary embodiment is not limited to the LFD for such advertisement and exhibition, and may be applied to many kinds of digital signage as long as it can reproduce content of various formats based on schedules.

The display apparatus 10 is connected to an external device 19 through the communicator 11 by a wired or wireless communication method, and receives schedule information and a plurality of pieces of content from the external device 19. The plurality of pieces of content includes at least one of container type files including a moving image, a still image, a word file, a text file, and various kinds of content. The container type file may be, for example, materialized by an ".lfd" file containing all of the moving image, the still image, the text, etc.

The external device 19 may be materialized by a server configured to store the plurality of pieces of content and provide content to at least one display apparatus 10 in accordance with schedules set to the schedule information. Further, the external device 19 may be divided into a server configured to distribute the schedule information, and a server configured to provide the content.

The display apparatus 10 downloads content from the external device 19 based on the schedule information received from the external device 19, and reproduces the completely downloaded or fully downloaded content in accordance with preset schedules. The elements of the display apparatus 10 are not limited to the foregoing descriptions, and may exclude some elements or include some additional elements.

To communicate with the external device 19, the communicator 11 may use a wired communication method such as Ethernet, etc. or a wireless communication method Wi-Fi, Bluetooth, etc. through a wireless router. For example, the communicator 11 may be materialized by a printed circuit board (PCB) including a wireless communication module for Wi-Fi. However, there are no limits to the communication methods of the communicator 11. Alternatively, the communicator 11 may communicate with the external device 19 through another communication method.

The user input 12 is configured to receive a user's input for controlling at least one function of the display apparatus 10. For example, the user input 12 may receive a user's input for selecting a part of a user interface displayed on the display 15. The user input 12 may be materialized in the form of an input panel provided outside the display apparatus 10 or a remote controller using an infrared ray to communicate with the display apparatus 10. Further, the user input 12 may be materialized by a keyboard, a mouse or the like connected to the display apparatus 10, or may be materialized by a touch screen provided in the display apparatus 10.

The storage 13 is configured to store a plurality of pieces of content downloaded from the external device 19 through the communicator 11. The storage 13 makes the plurality of pieces of stored content be subjected to reading, writing, editing, deleting, updating, etc. The storage 13 may be materialized by a flash memory, a hard disc drive or the like nonvolatile memory that retains data regardless of whether the display apparatus 10 is turned on or off.

The signal processor 14 is configured to perform a preset video processing process to reproduce the plurality of pieces of content stored in the storage 13. The signal processor 14 includes a demuxer, a decoder and a renderer, and each of such elements corresponds to a part of the video processing processes. Besides, the video processing processes performed in the signal processor 14 may further include de-interlacing, scaling, noise reduction, detail enhancement, etc. without limitations. The signal processor 14 may be materialized by a system on chip (SoC) where many functions are integrated, or an image processing board to which individual modules for independently performing the processes are mounted.

The display 15 reproduces and displays content based on a video signal processed by the signal processor 14. The display 15 is provided as a large format display (LFD) that displays a guide screen to be used in a public place, a commercially used advertising screen, etc. The LFD may be also called a digital signage or a digital information display. The display 15 may be achieved by various types. For example, the display 15 may be achieved by a plasma display panel (PDP), a liquid crystal display (LCD), an organic light emitting diode (OLED), a flexible display, etc. without limitations.

The controller 16 is materialized by at least one processor for controlling a program command to be executed so that all the elements involved in the display apparatus 10 can operate. The at least one processor may be materialized by a central processing unit (CPU), and includes three regions for control, a computation and a register. The control region analyzes a program command, and controls the elements of the display apparatus 10 to operate in accordance with the analyzed commands. The computation region performs arithmetic operations and logical operations, and implements computations needed for operating the elements of the display apparatus 10 in response to a command from the control region. The register region is a memory location to store information or the like needed while the CPU is executing an instruction, stores instructions and data for the elements of the display apparatus 10 and computation results.

The controller 16 receives the schedule information about reproduction for the plurality of pieces of content from the external device 19 through the communicator 11. The schedule information may be for example provided as a schedule file having an extension of ".sch", and the schedule file may be created to have an extensible markup language (XML) structure.

The schedule information includes information about a reproduction channel including a plurality of pieces of content, at least one frame set according to reproduction channels, a reproduction section set with respect to a content type and each of the plurality of pieces of content, etc. Here, the information about the reproduction channel includes information about a specific advertisement channel, an exhibition channel, an education channel, and the like through which a plurality of pieces of content is provided. The information about the frames according to reproduction channels includes information about frames corresponding to a plurality of areas divided for reproducing the plurality of pieces of content on one screen at one time. For example, the maximum number of channels and frames reproducible on one screen may be respectively set as one channel and four frames in the schedule information.

Here, the content type includes at least one among single content, a content playlist, and combination content in which many types of content are combined. The single content refers to one of a moving image, a still image, a word file, a text file, etc. The content playlist refers to a list of content such as a moving image, a still image, etc. made by a user to be successively reproduced. The combination content refers to content generated by combining many types of content such as a moving image, a still image, a text file, etc. in one container file form. For example, the combination content may be materialized by a container type file having an extension of ".lfd" including a moving image, a still image, a text, etc.

The controller 16 controls the display 15 to display a plurality of pieces of content related to the reproduction channel according to set schedules based on information about the reproduction channel of the schedule information. Further, the controller 16 may control the display 15 to display an area corresponding to each of at least one frame based on information about the frames according to the reproduction channels of the schedule information, and reproduce at least one piece of content set for the corresponding frame within each area according to the schedules. In this case, a multithreading operation is implemented to make pieces of content different according to the areas of the plurality of frames be simultaneously reproduced on one screen according to the schedules.

If receiving the schedule information, the controller 16 determines first content to be firstly reproduced among the plurality of pieces of content based on the schedule information. If it is determined that the first content is completely downloadable during a first section in which the first content is set to be reproduced, the controller 16 starts downloading the first content.

If the first content is completely downloaded, the controller 16 determines whether second content to be secondly displayed following the first content is completely downloadable before the first content among the plurality of pieces of content is completely reproduced, based on the received schedule information.

If it is determined that the second content is completely downloadable before the first content is completely reproduced, the controller 16 starts downloading the second content while the first content is reproduced. On the other hand, if it is determined that the second content is not completely downloadable before the first content is completely reproduced, the controller 16 performs control to start downloading the second content instead of reproducing the first content.

That is, before reproducing the first content after completely downloading the first content, it is determined whether the second content set to be reproduced during a second section following the first section is completely downloadable or not during the first section in which the first content is set to be reproduced, thereby downloading the second content while reproducing the first content.

Thus, unlike a conventional method of reproducing the plurality of pieces of content according to schedules only after downloading all the pieces of content, the next content is simultaneously downloaded while the content (the current content) is reproduced according to schedules, thereby shortening the time from downloading to reproducing the plurality of pieces of content.

According to an exemplary embodiment, based on the schedule information, the controller 16 downloads the first content during the first section if it is determined that the first content is completely downloadable during the first section, and downloads the second content instead of downloading the first content during the first section if it is determined that the first content is not completely downloadable during the first section.

Thus, an inefficient downloading operation is prevented by determining whether to start downloading based on a downloading completion time of content to be firstly reproduced. In other words, if the downloading completion time of the content to be firstly reproduced is later than a reproducing completion time thereof, the next content to be secondly reproduced is downloaded without performing a wasteful downloading operation of the first content since the reproduction is impossible.

According to an exemplary embodiment, the controller 16 may reproduce preset default content instead of the first content during the first section if the first content is not completely downloadable during the first section, based on the schedule information. That is, the reproduction based on the set schedules is impossible when the downloading completion time of the content to be firstly reproduced is later than the reproducing completion time thereof, and therefore substitute content previously specified by a user is provided to thereby prevent a reproduction break in the content from occurring on the screen.

According to an exemplary embodiment, the controller 16 determines whether the second content and third content to be displayed subsequent to the second content are completely downloadable until the reproducing completion time of the first content based on the schedule information, and simultaneously or sequentially downloads the second content and the third content while the first content is reproduced if it is determined that the second content and third content are completely downloadable. Thus, the operation of downloading the next pieces of content to be subsequently reproduced is processed concurrently with the operation of reproducing the current content, thereby shortening the time needed to start the reproduction of the contents.

According to an exemplary embodiment, the controller determines at least one piece of content completely downloadable among the plurality of pieces of content set to be subsequently reproduced in sequence by the reproducing completion time of the first content based on the schedule information, and downloads the at least one piece of content while the first content is reproduced. For example, if the first content, the second content, the third content, the fourth content, and the fifth content are scheduled to be reproduced in sequence, and the third content and the fifth content are completely downloadable while the first content is reproduced, the third content and the fifth content are downloaded earlier than the second content and the fourth content. Like this, it is possible to shorten time taken up to the reproduction (the time required to start the reproducing of a respective content) by changing the order of downloading the pieces of content to be subsequently reproduced while the current content is reproduced according to the schedules.

Figure 2:
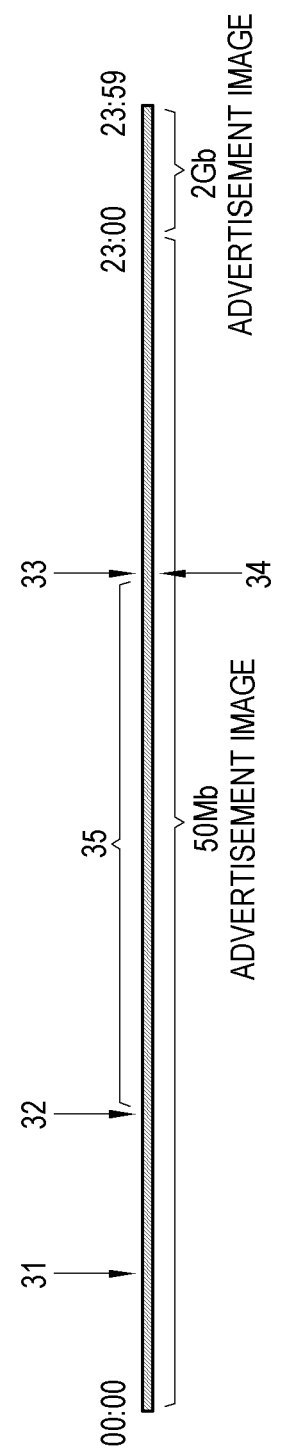
FIG. 2 is a view illustrating downloading content in a related art.

FIG. 2 is a view illustrating downloading content in a related art. As shown in FIG. 2, a conventional digital signage downloads and reproduces content based on a schedule file distributed from a server. Referring to FIG. 2, based on the schedule file, an advertisement image of 50 Mb is set to be reproduced from time 00:00 to time 23:00, and an advertisement image of 2 Gb is set to be reproduced from time 23:00 to time 23:29.

In this case, to reproduce content according to the specified schedules, the content of 50 Mb first begins to be downloaded (31), and then the content of 2 GB begins to be downloaded (32) at the same time when the content of 50 Mb is completely downloaded. Therefore, the content of 50 Mb is not reproduced immediately after the content of 50 Mb is completely downloaded (32), but begins to be reproduced (34) only after the content of 2 Gb is completely downloaded (33). That is, any content as well as the content of 50 Mb is not reproducible during a section 35 for downloading the content of 2 Gb corresponding to even after the content of 50 Mb lasting an hour is completely downloaded (32).

As described above, the conventional digital signage has problems in that downloading processes are inefficient and much time is taken from downloading to reproducing since pieces of content are reproducible only after all the pieces of content are completely downloaded in sequence one by one.

Figure 3:
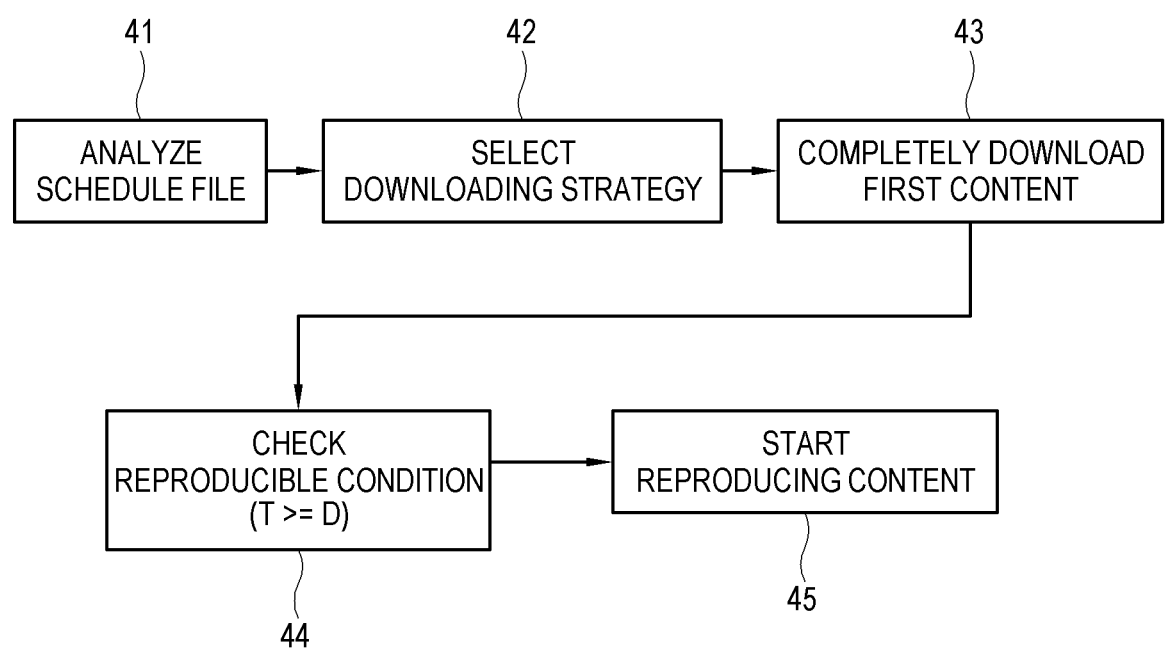
FIG. 3 is a flowchart illustrating downloading content through an extent downloader according to an exemplary embodiment.

FIG. 3 is a flowchart illustrating downloading content through an extent downloader according to an exemplary embodiment. As shown in FIG. 3, the display apparatus 10 according to an exemplary embodiment employs an extent downloader algorithm to download and reproduce content. The display apparatus 10 first analyzes a schedule file distributed from an external device 19 (41), and selects a downloading strategy according to analysis results (42). In this case, it will be assumed that the extent downloader algorithm is selected as the downloading strategy.

Next, the first content is completely downloaded (43), and then it is determined whether the completely downloaded first content is reproducible (44). Here, a condition for determining whether the first content is reproducible includes determining whether downloading completion time D of content to be subsequently reproduced is earlier than the reproducing completion time T of the first content. Here, the downloading completion time D of the content to be subsequently reproduced may be estimated based on information included in the schedule file, the size of content, and a current network state, etc.

If it is determined that the downloading completion time D of the content to be subsequently reproduced is faster than the reproducing completion time T of the first content, the first content begins to be reproduced (45). In this case, the content to be subsequently reproduced begins to be downloaded at the same time when the first content is reproduced, so that the content to be subsequently reproduced can be reproduced without any break in a reproducing section as scheduled.

With an exemplary embodiment, the extent downloader algorithm is used to determine whether the downloading completion time of the next content is earlier than the reproducing completion time of the current content, and it is therefore possible to reproduce the content even if all the pieces of content are not completely downloaded.

Figure 4:
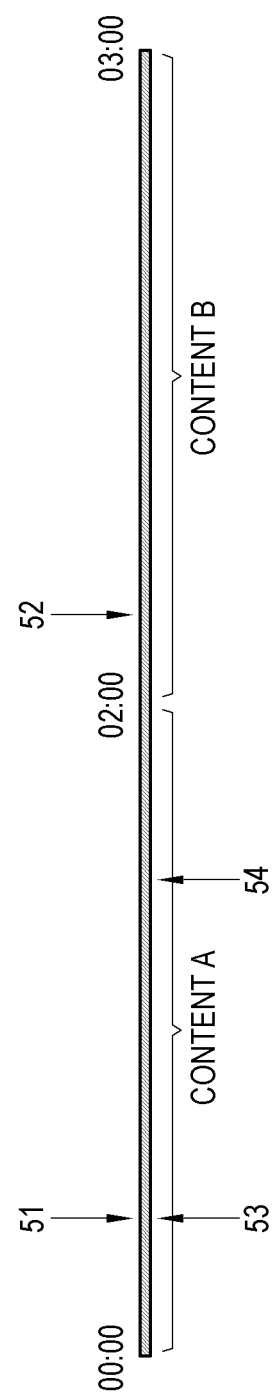
FIG. 4 is a view illustrating downloading content through a strategic downloader according to an exemplary embodiment.

FIG. 4 is a view illustrating downloading content through a strategic downloader according to an exemplary embodiment. As shown in FIG. 4, the display apparatus 10 according to an exemplary embodiment employs a strategic downloader algorithm to download and reproduce content. Referring to FIG. 4, the display apparatus 10 is set to reproduce content A from time 00:00 to time 02:00 and set reproduce content B from time 02:00 to time 03:00, based on a schedule file distributed from the external device 19.

The display apparatus 10 estimates each downloading completion time of the content A and the content B before downloading the content A set to be first reproduced as scheduled. That is, a time 52 at which the content A is completely downloaded from a downloading start time 51, and a time 54 at which the content B is completely downloaded from a downloading start time 53 are estimated. Here, the downloading completion time of the content may be estimated based on information included in the schedule file, the size of content, a current network states, etc.

The display apparatus 10 first downloads not the content A but the content B if it is estimated that the downloading completion time 52 of the content A is later than the downloading completion time 54 of the content B. In this case, the content A is not reproducible since it is not downloaded from the downloading start time of the content B to time 02:00, and therefore default content previously specified by a user is displayed. In an exemplary embodiment, since the downloading of the content A will be completed at a time 52 which is after the completion of the reproduction time of the content A (2:00), the download of the content A is omitted or skipped.

If the content A but not the content B is first downloaded, it is not guaranteed to reproduce other pieces of content after time 03:00 as well as the content A and the content B. However, if the content B is first downloaded, it is possible to not only reproduce the content B but also download other pieces of content after time 03:00 on the background. Therefore, it is possible to reproduce content after the content B as scheduled without a break in a reproducing section.

With an exemplary embodiment, the strategic downloader algorithm is used to estimate the downloading completion time and change order of downloading the content, thereby minimizing a break in the reproducing section as scheduled. That is, a break in reproducing the pieces of contents is shortened.

Figure 5:
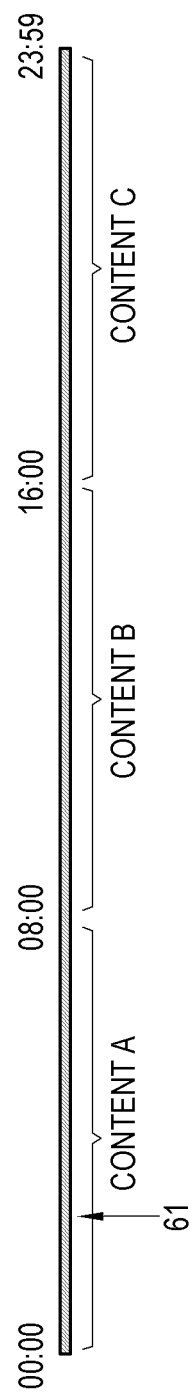
FIG. 5 is a view illustrating a reproduction schedule for content to be downloaded through the strategic downloader according to an exemplary embodiment.

Below, a method of downloading content through the strategic downloader according to an exemplary embodiment will be described with reference to FIG. 5 to FIG. 9. FIG. 5 illustrates an example of a reproduction schedule for content to be downloaded through the strategic downloader according to an exemplary embodiment. As shown in FIG. 5, according to an exemplary embodiment the display apparatus 10 downloads and reproduces content through the strategic downloader algorithm. When the schedule file is distributed from the external device (61), the display apparatus 10 reproduces the content based on the reproduction schedule information included in the distributed schedule file.

In an exemplary embodiment, the distributed schedule file received in the display apparatus 10 is set to reproduce the content A from time 00:00 to time 07:59, the content B from time 08:00 to time 15:59, and content C from time 16:00 to time 23:59. In addition, predetermined content based on a previously distributed different schedule file is displayed from time 00:00 to the distribution 61 of the schedule file.

In an exemplary embodiment, the display apparatus 10 cannot reproduce the content A as scheduled while downloading the content A to be first reproduced after the distribution 61 of the schedule file. In this case, the default content previously set by a user may be reproduced. That is, the default content set by a user is stored in the storage 13, and reproduced when the content is not reproduced as scheduled.

Figure 6:
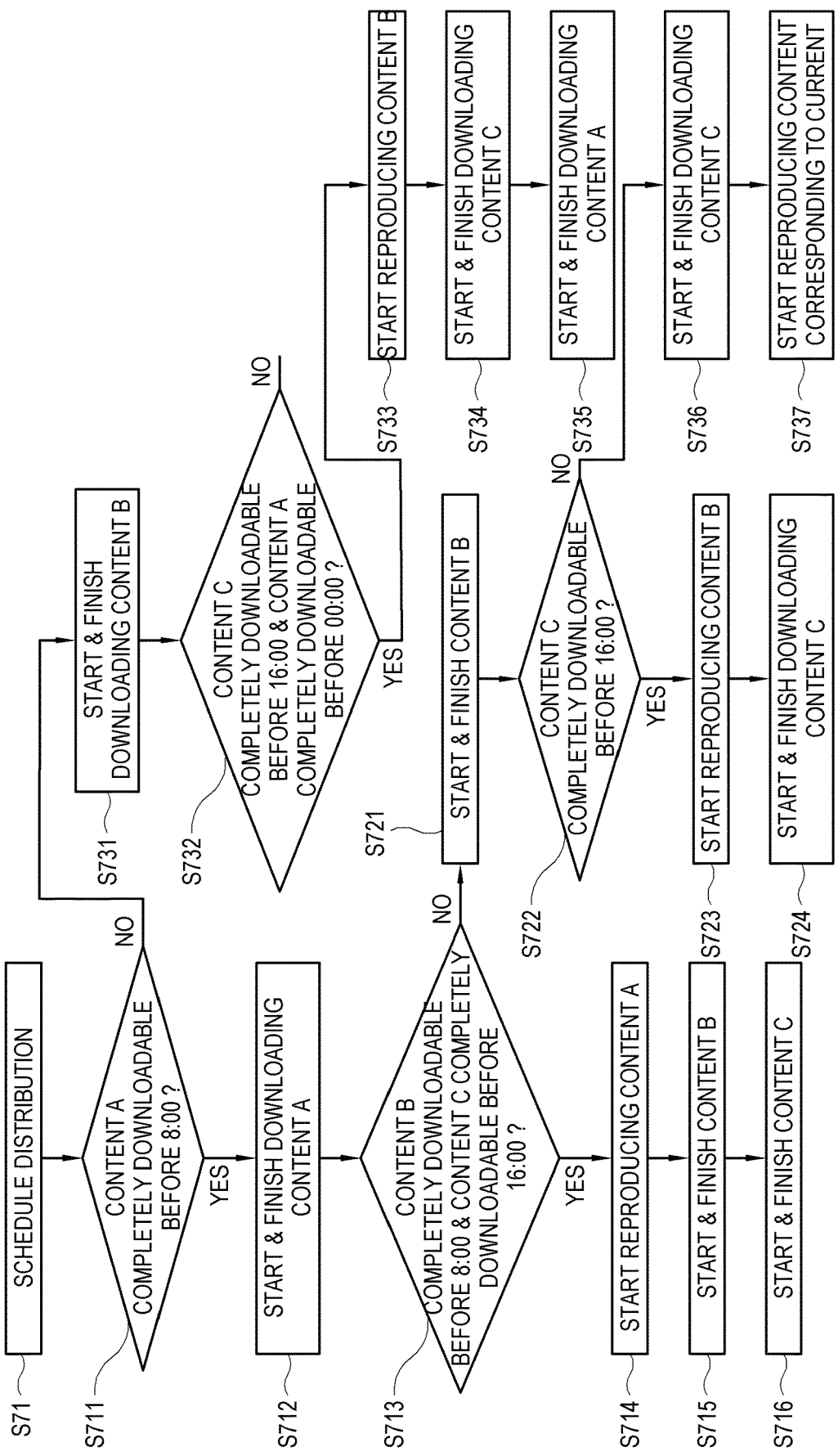
FIG. 6 is a flowchart illustrating downloading content through the strategic downloader according to an exemplary embodiment.

FIG. 6 is a flowchart of downloading content through the strategic downloader according to an exemplary embodiment. As shown in FIG. 6, the display apparatus 10 according to an exemplary embodiment downloads and reproduces through the strategic downloader algorithm.

First, at operation S71, the external device 19 distributes a schedule file. In an exemplary embodiment, the reproduction schedules of the content A, the content B, and the content C specified in the schedule file will be referred to those shown in FIG. 5, by way of an example.

At operation S711, it is determined whether the content A is completely downloadable until or before the time 08:00. If it is determined that the content A is completely downloadable, at operation S712 the content A begins to be downloaded and is completely downloaded.

Next, at operation S713, it is determined whether the content B is completely downloadable before the time 08:00 and whether the content C is completely downloadable before time 16:00. If it is determined that they (both pieces of content) are completely downloadable, at operation S714, the content A begins to be reproduced and at operation S715, the content B begins to be downloaded and is completely downloaded. Further, at operation S716, the content C begins to be downloaded and is completely downloaded.

During the operation S714 for reproducing the content A, the operation S715 for downloading the content B and the operation S716 for downloading the content C may be performed simultaneously or sequentially.

If it is determined in the operation S713 that the content B and the content C are not completely downloadable, at operation S721, the content B begins to be downloaded and is completely downloaded without reproducing the content A. Next, at operation S722, it is determined whether the content C is completely downloadable until time 16:00. If the content C is completely downloadable, at operation S723, the content B begins to be reproduced and at operation S724, the content C begins to be downloaded and is completely downloaded. In this case, the operation S724 for downloading the content C is performed simultaneously with the operation S723 for reproducing the content B.

Further, if it is determined in the operation S722 that the content C is not completely downloadable, at operation S736, the content C beings to be downloaded and is completely downloaded without reproducing the content B. Next, at operation S737, the content C begins to be reproduced at the current time.

On the other hand, if it is determined in the operation S711 that the content A is not completely downloadable until 08:00, at operation S731, the content B begins to be downloaded and is completely downloaded. Next, at operation S732, it is determined whether the content C is completely downloadable until time 16:00 and the content A is completely downloadable until time 00:00.

If it is determined that they are completely downloadable, at operation S733, the content B begins to be reproduced and at operation S734, the content C begins to be downloaded and is completely downloaded. Further, at operation S735, the content A begins to be downloaded and is completely downloaded. During the operation S733 for reproducing the content B, the operation for downloading the content C and the operation S735 for downloading the content A may be performed simultaneously or sequentially.

According to an exemplary embodiment, the display apparatus 10 analyzes the distributed schedule file and changes the order of downloading the content, thereby minimizing a break in a reproducing section on the schedule. In other words, a break in the reproduction time is shortened. Further, it is possible to shorten time taken from the downloading up to the reproducing by changing the order of downloading the content.

Figure 7:
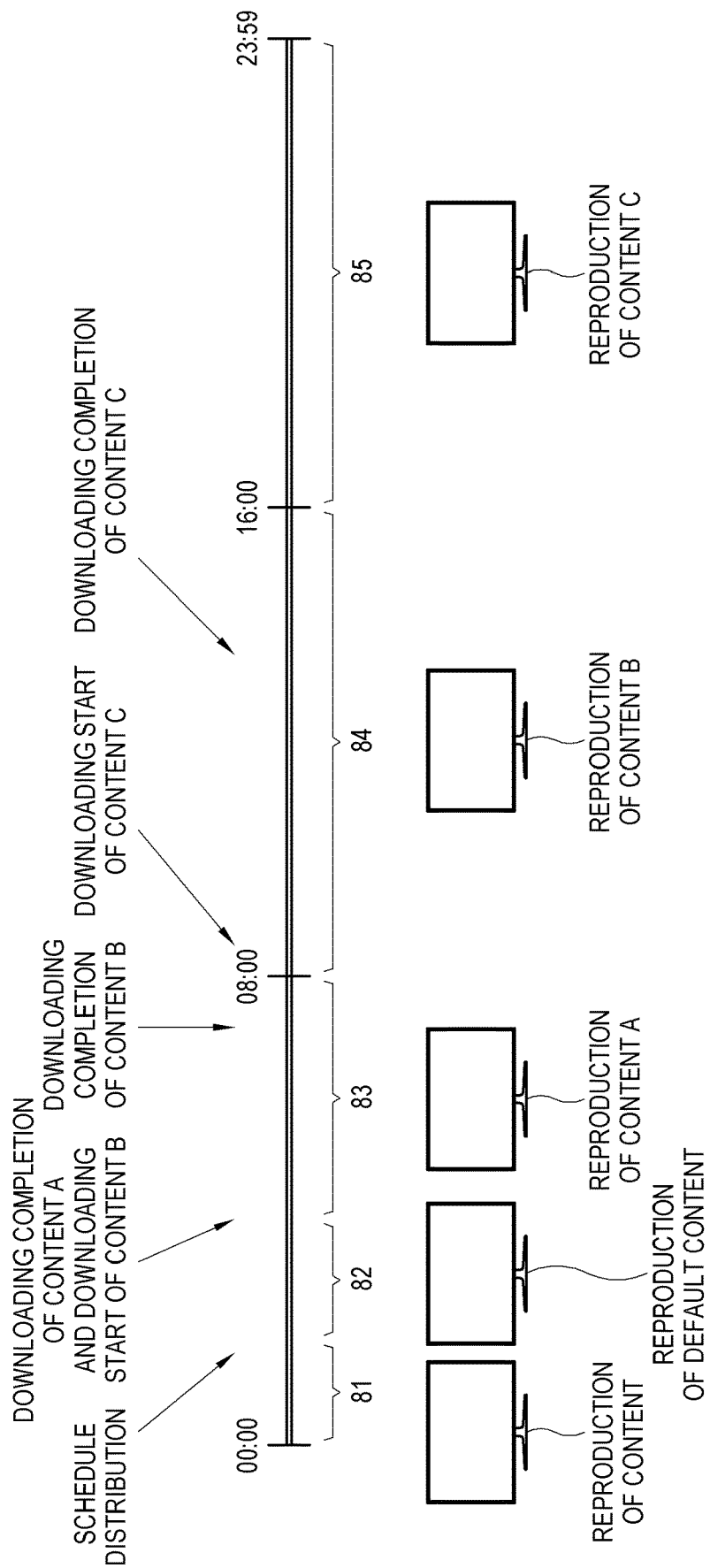
FIG. 7 is a view illustrating downloading content through the strategic downloader according to an exemplary embodiment.

FIG. 7 illustrates an example of downloading content through the strategic downloader according to an exemplary embodiment. As shown in FIG. 7, the display apparatus 10 according to an exemplary embodiment downloads and reproduces the content A, the content B, and the content C according to the reproduction schedule shown in FIG. 5.

First, if the schedule file is distributed from the external device 19, the display apparatus 10 starts and finishes downloading the content A based on the distributed schedule file 82. In this case, predetermined content is displayed based on a previously distributed different schedule file from time 00:00 to the distribution 81 of the schedule. Further, since the content A is not reproducible until the content A begins to be downloaded and is completely downloaded after the schedule is distributed, the default content previously set by a user is reproduced.

If the content A is completely downloaded, it is estimated whether the content B is downloadable until the reproducing completion time of the content A, i.e. time 08:00. In this case, the downloading completion time of the content B is estimated based on information included in the schedule file, the size of content, a current network state, etc.

If it is estimated that the content B is completely downloadable until time 08:00, the display apparatus 10 reproduces the completely downloaded content A and at the same time starts and finishes downloading the content B. That is, the content B is downloaded on the background while the content A is reproduced (83), and it is therefore possible to reproduce the content B from time 08:00 to 16:00 as scheduled without any break in the reproducing section or reproduction time.

Next, if the content B is completely downloaded until time 08:00, the display apparatus 10 estimates whether the content C is completely downloadable until the reproducing completion time of the content B, i.e. time 16:00. In this case, it is also possible to estimate the downloading completion time of the content C based on information included in the schedule file, the size of content, a current network state, etc.

If it is estimated that the content C is completely downloadable until time 16:00, the display apparatus 10 reproduces the completely downloaded content B from time 08:00 and at the same time starts and finishes downloading the content C. That is, the content C is downloaded on the background while the content B is reproduced (84), and it is therefore possible to reproduce the content C from time 16:00 to time 23:59 as scheduled.

According to an exemplary embodiment, the content begins to be reproduced even though all the pieces of content are not completely downloaded, and it is therefore possible to shorten time taken from the downloading up to the reproducing.

Figure 8:
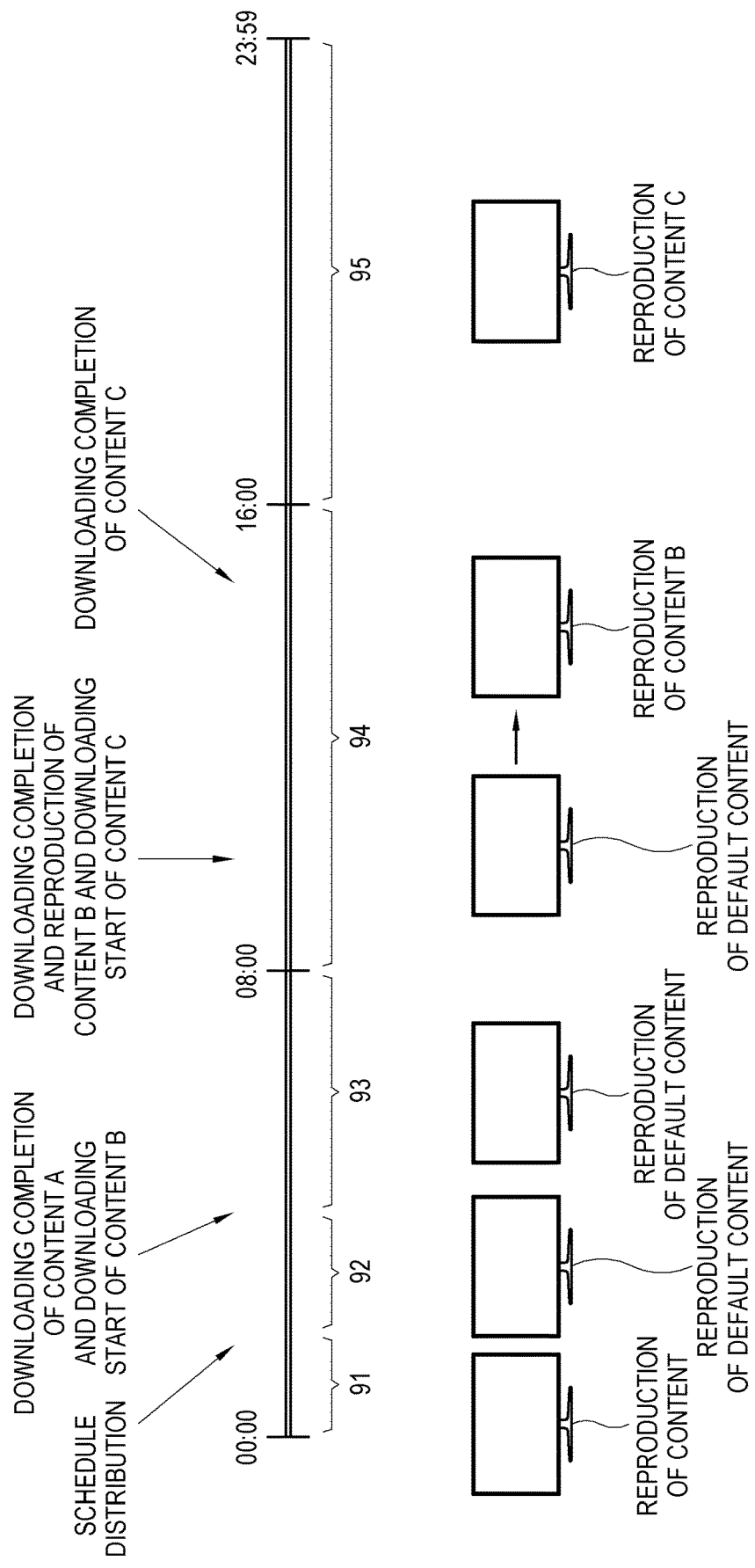
FIG. 8 is a view illustrating downloading content through the strategic downloader according to an exemplary embodiment.

FIG. 8 illustrates an example of downloading content through the strategic downloader according to an exemplary embodiment. As shown in FIG. 8, the display apparatus 10 according to an exemplary embodiment downloads and reproduces the content A, the content B, and the content C according to the reproduction schedule shown in FIG. 5.

First, if the schedule file is distributed from the external device 19, the display apparatus 10 starts and finishes downloading the content A based on the distributed schedule file (92). In this case, predetermined content is reproduced based on a previously distributed different schedule file from time 00:00 to the distribution 91 of the schedule. Since the content A is not reproduced until the content A begins to be downloaded and is completely downloaded after the schedule is distributed, the default content previously set by a user is reproduced.

If the content A is completely downloaded, it is estimated whether the content B is completely downloadable until the reproducing completion time of the content A, i.e. time 08:00. In this case, the downloading completion time of the content B may be estimated based on information included in the schedule file, the size of content, a current network state, etc.

If it is estimated that the display apparatus 10 is not completely downloadable until time 08:00, the content B begins to be downloaded without reproducing the completely downloaded content A. In this case, the content A is not reproduced while downloading the content B (93), and therefore the default content previously set by a user is reproduced.

Next, if the content B begins to be downloaded and is completely downloaded after time 08:00, the display apparatus 10 estimates whether the content C is completely downloadable until the reproducing completion time of the content B, i.e. time 16:00.

If it is estimated that the content C is completely downloadable until time 16:00, the display apparatus 10 reproduces the completely downloaded content B after time 08:00 and at the same time begins and finishes downloading the content C. In this case, the default content is reproduced from time 08:00 to the downloading completion time of the content B, and then the content B is reproduced by time 16:00 if the content B is completely downloaded (94). Further, the content C is downloaded on background while the content B is reproduced, and therefore the content C is reproducible from time 16:00 to time 23:59 as scheduled.

Figure 9:
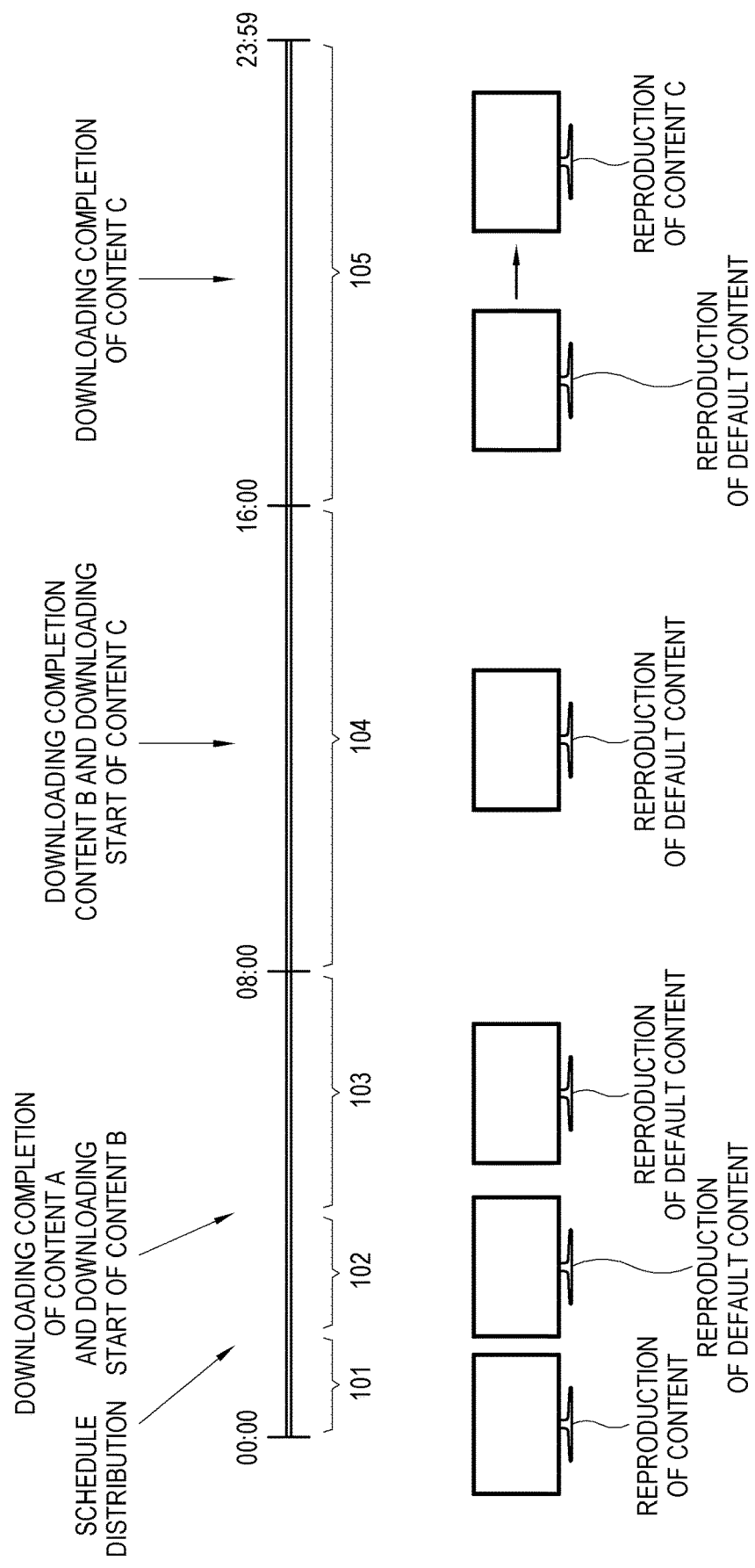
FIG. 9 is a view illustrating downloading content through the strategic downloader according to an exemplary embodiment.

FIG. 9 illustrates an example of downloading content through the strategic downloader according to an exemplary embodiment. As shown in FIG. 9, the display apparatus 10 according to an exemplary embodiment downloads and reproduces the content A, the content B, and the content C according to the reproduction schedule shown in FIG. 5.

First, if the schedule file is distributed from the external device 19, the display apparatus 10 starts and finishes downloading the content A based on the distributed schedule file (102). In this case, predetermined content is reproduced based on previously distributed different schedule file from time 00:00 to the distribution 101 of the schedule. Since the content A is not reproducible until the content A begins to be downloaded and is completely downloaded 102 after the schedule is distributed, the default content previously set by a user is reproduced.

If the content A is completely downloaded, it is estimated whether the content B is completely downloadable until the reproducing completion time of the content A, i.e. time 08:00. In this case, the downloading completion time of the content B may be estimated based on information included in the schedule file, the size of content, a current network state, etc.

If it is estimated that the content B is not completely downloadable until time 08:00, the display apparatus 10 starts downloading the content B without reproducing the completely downloaded content A. In this case, the content A is not reproduced while the content B is downloaded (103), and therefore the default content previously set by a user is reproduced.

Next, if the content B begins to be downloaded and is completely downloaded after time 08:00, the display apparatus 10 estimates whether the content C is completely downloadable until the reproducing completion time of the content B, i.e. time 16:00.

If it is estimated that the content C is not completely downloadable until time 16:00, the display apparatus 10 starts downloading the content C without repeating the completely downloaded content B. In this case, the content B is not reproduced from time 08:00 to time 16:00 (104) and the content B and the content C are continuously downloaded, and therefore the default content previously set by a user is reproduced.

Further, if the content C begins to be downloaded before time 16:00 and is completely downloaded after time 16:00, the display apparatus 10 reproduces the content C from the downloading completion time to time 23:59. In this case, the default content previously set by a user is reproduced from time 16:00 to the downloading completion time of the content C, and the content C is reproduced from the downloading completion time of the content C to time 23:29.

Figure 10:
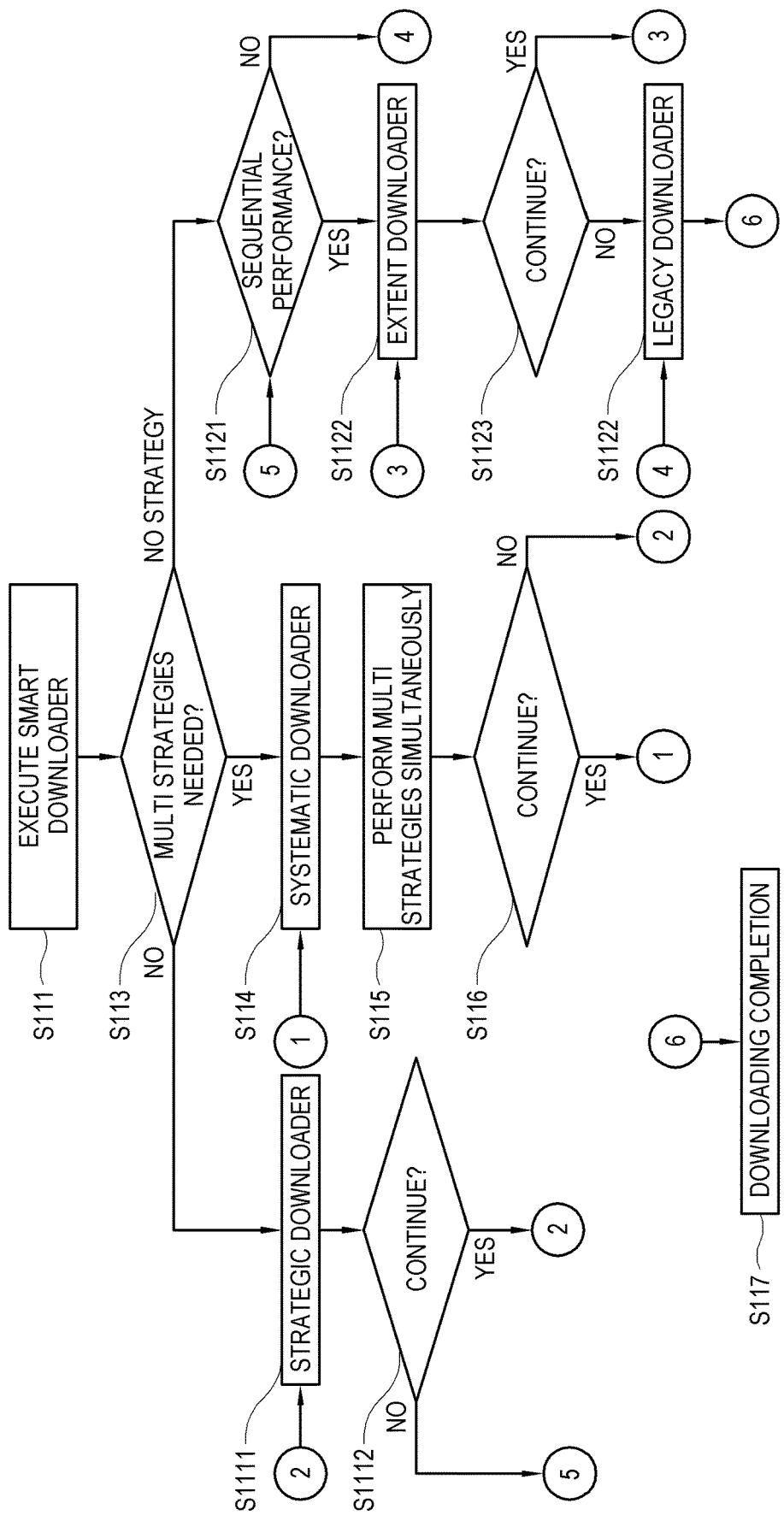
FIG. 10 is a flowchart illustrating downloading content by combining many strategies according to an exemplary embodiment.

FIG. 10 is a flowchart of downloading content by combining many strategies according to an exemplary embodiment. As shown in FIG. 10, the display apparatus 10 according to an exemplary embodiment, first executes a smart downloader algorithm to download a plurality of pieces of content from the external device 19 or other servers at operation S111. Next, it is determined at operation S113 whether multi strategies are required or not. If the multi strategies are needed, at operation S114 a systematic downloader is selected.

Here, the systematic downloader is selected when the display apparatus 10 employs a plurality of channels and a plurality of frames to download and reproduce content. That is, the systematic downloader can use strategic downloader algorithms different according to areas corresponding to the plurality of channels or the plurality of frames.

If the systematic downloader is selected in the operation S114, the multi strategies are simultaneously performed at operation S115. That is, downloading and reproducing of content are simultaneously performed using the strategies different according to the plurality of channels or the plurality of frames. Next, in accordance with determination in continuity at operation S116, downloading is completed at operation S117 or the systematic downloader is selected at operation S114.

If it is determined in the operation S113 that the multi strategies are not needed, the strategic downloader is selected at operation S1111. Here, the strategic downloader dynamically selects a strategy in accordance with schedule characteristics and network states based on the schedule file distributed from the external device 19. Specifically, the downloading completion time of the content is estimated taking the size of content, the network states, etc. into account, and thus the order of downloading the content is changed.

Accordingly, the strategic downloader has advantages that the most efficient downloading method is determined in real time according to schedule characteristics, the size of content, network states, etc.

Next, in accordance with determination in continuity of the strategic downloader at operation S1112, sequential performance is determined at operation S1121 or the strategic downloader is selected in the operation S1111.

If it is determined in the operation S113 that the multi strategies are not needed (i.e., no strategy), the sequential performance is determined at operation S1121. If it is determined that the sequential performance is required, the extent downloader is selected at operation S1122. Here, the extent downloader is the most basic strategy in an exemplary embodiment, which starts reproduction according to reproduction conditions before all the pieces of content is completely downloaded while sequentially downloading pieces of content based on the schedule file distributed from the external device 19.

In this case, the conditions that the reproduction is possible may be set by determining whether the downloading completion time D of the content to be subsequently reproduced is earlier than the reproducing completion time T of the first content. If it is determined that the downloading completion time D of the content to be subsequently reproduced is earlier than the reproducing completion time T of the first content, the content to be subsequently reproduced begins to be downloaded at the same time when the first content is reproduced.

Next, in accordance with determination in continuity of the extent downloader at operation S1123, a legacy downloader is selected at operation S1124 or the extent downloader is selected at operation S1122. Here, the legacy downloader refers to a related art content downloading strategy, in which the content is reproduced as scheduled only after all the pieces of content is completely downloaded.

As described above, according to an exemplary embodiment, various factors such as the characteristics of the schedule and content, the network states, etc. are taken into account when the content is downloaded, thereby selecting the most efficient downloading strategy. Thus, it is effective to shorten time taken from downloading up to reproducing the content.

Figure 11:
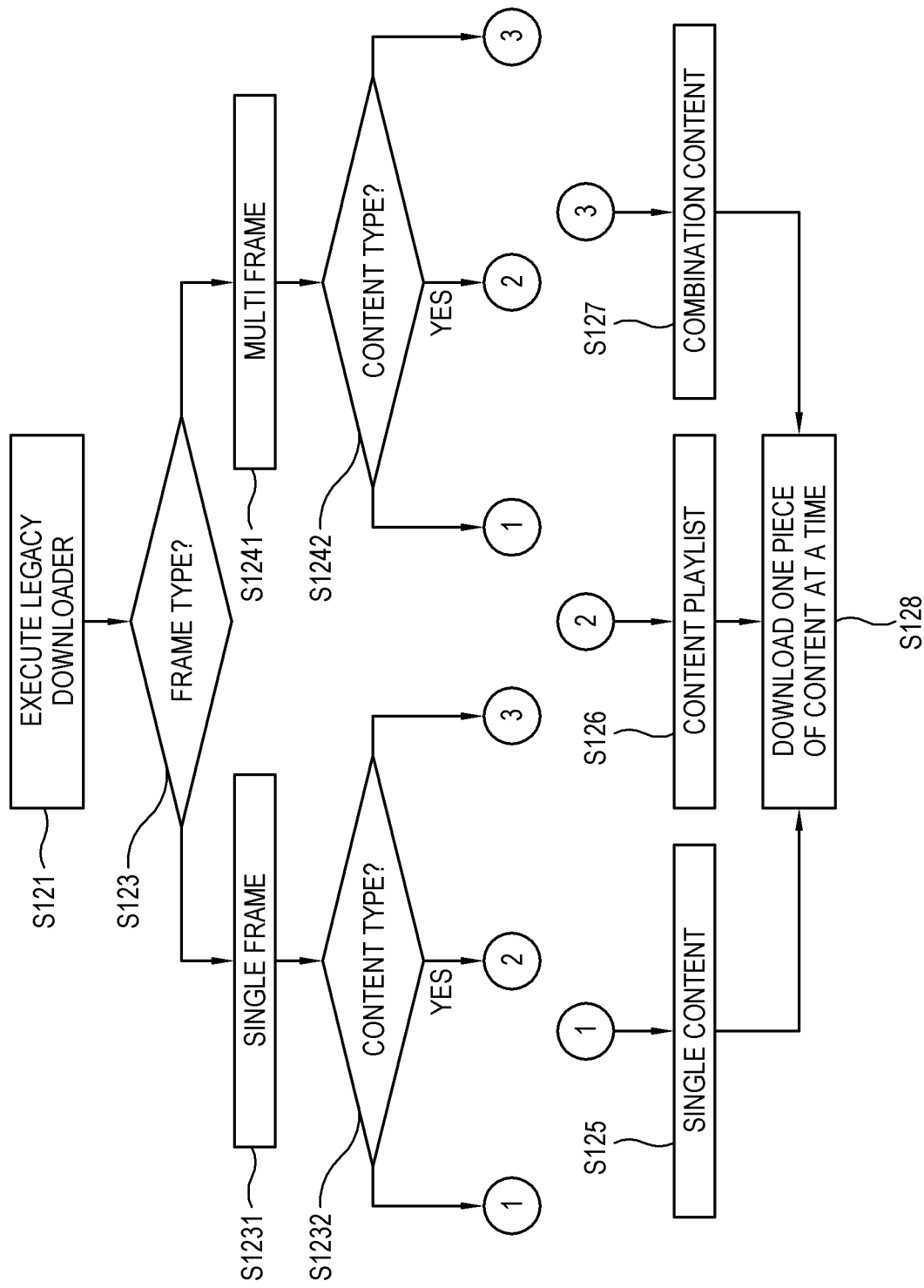
FIG. 11 is a flowchart illustrating downloading content through a legacy downloader according to an exemplary embodiment.

FIG. 11 is a flowchart of downloading content through a legacy downloader according to an exemplary embodiment. As shown in FIG. 11, if the display apparatus 10 according to an exemplary embodiment selects a legacy downloader algorithm as a strategy for downloading content, the legacy downloader is executed at operation S121.

Next, a frame type is determined at operation S123. If the frame type is determined as a single frame at operation S1231, a content type is determined at operation S1232. At this time, the content type is determined as one among single content S125, a content playlist S126 and combination content S127, and the content in each case is downloaded one by one at operation S128.

In case where it is determined in the operation S123 that the frame type is determined as multi frames S1241, it is determined at operation S1242 which one of the single content S125, the content playlist S126 and the combination content S127 the content type is according to the plurality of frames, and one piece of content is downloaded at a time according to the plurality of frames at operation S128 in each case.

Like this, if the display apparatus 10 according to an exemplary embodiment employs the legacy downloader algorithm as the downloading strategy, all the pieces of content is downloaded by taking the frame types and the content types into account and then reproduced as scheduled.

Figure 12:
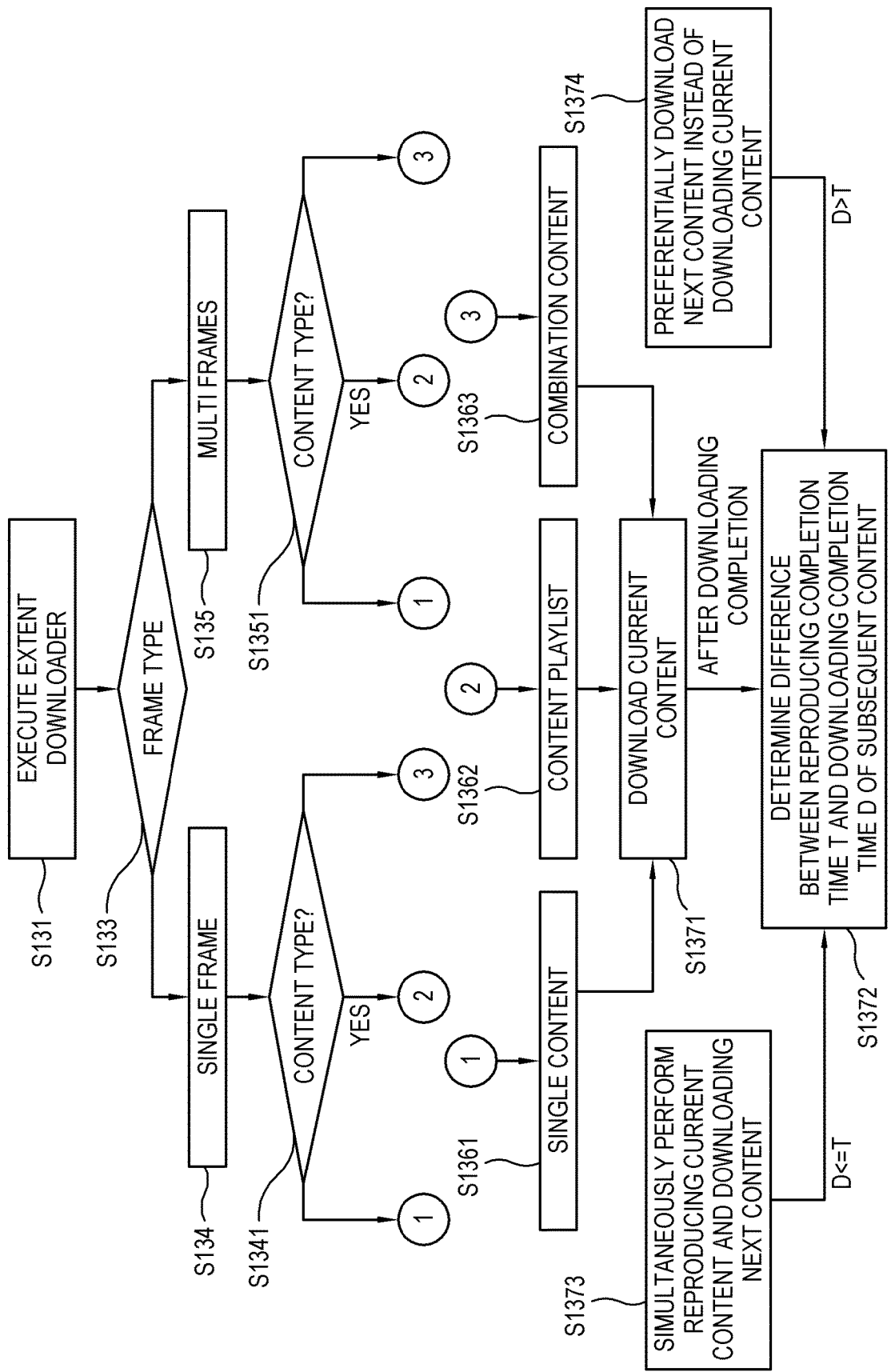
FIG. 12 is a flowchart illustrating downloading content through the extent downloader according to an exemplary embodiment.

FIG. 12 is a flowchart of downloading content through the extent downloader according to an exemplary embodiment. As shown in FIG. 12, if the display apparatus 10 employs the extent downloader algorithm as a strategy for downloading content, the extent downloader is executed at operation S131.

Next, the frame type is determined at operation S133. If the frame type is determined as a single frame at operation S134, a content type is determined at operation S1341. Further, in case of multi frame S135, the content type is determined at operation S1351. In both cases of the single frame S134 and the multi frames S135, it is determined which one of single content S1361, a content playlist S1362 and combination content S1363 the content type is, and current content is downloaded based on a reproduction schedule at operation S1371 with regard to each case.

Next, at operation S1372, difference between the reproducing completion time T of the current content and the downloading completion time D of the next content is determined. If it is determined that the downloading completion time D of the next current is earlier than the reproducing completion time T of the current content (D<=T), the reproducing of the current content and the downloading of the next content are simultaneously performed at operation S1373. On the other hand, if it is determined that the downloading completion time D of the next content is later than the reproducing completion time T of the current content (D>T), the next content is preferentially downloaded instead of downloading the current content at operation S1374.

Like this, if the display apparatus 10 according to an exemplary embodiment employs the extent downloader algorithm as the downloading strategy, it is determined whether the downloading completion time of the next content is earlier than the reproducing completion time of the current content, and thus the content is reproducible according even though all the pieces of content are not downloaded.

Figure 13:
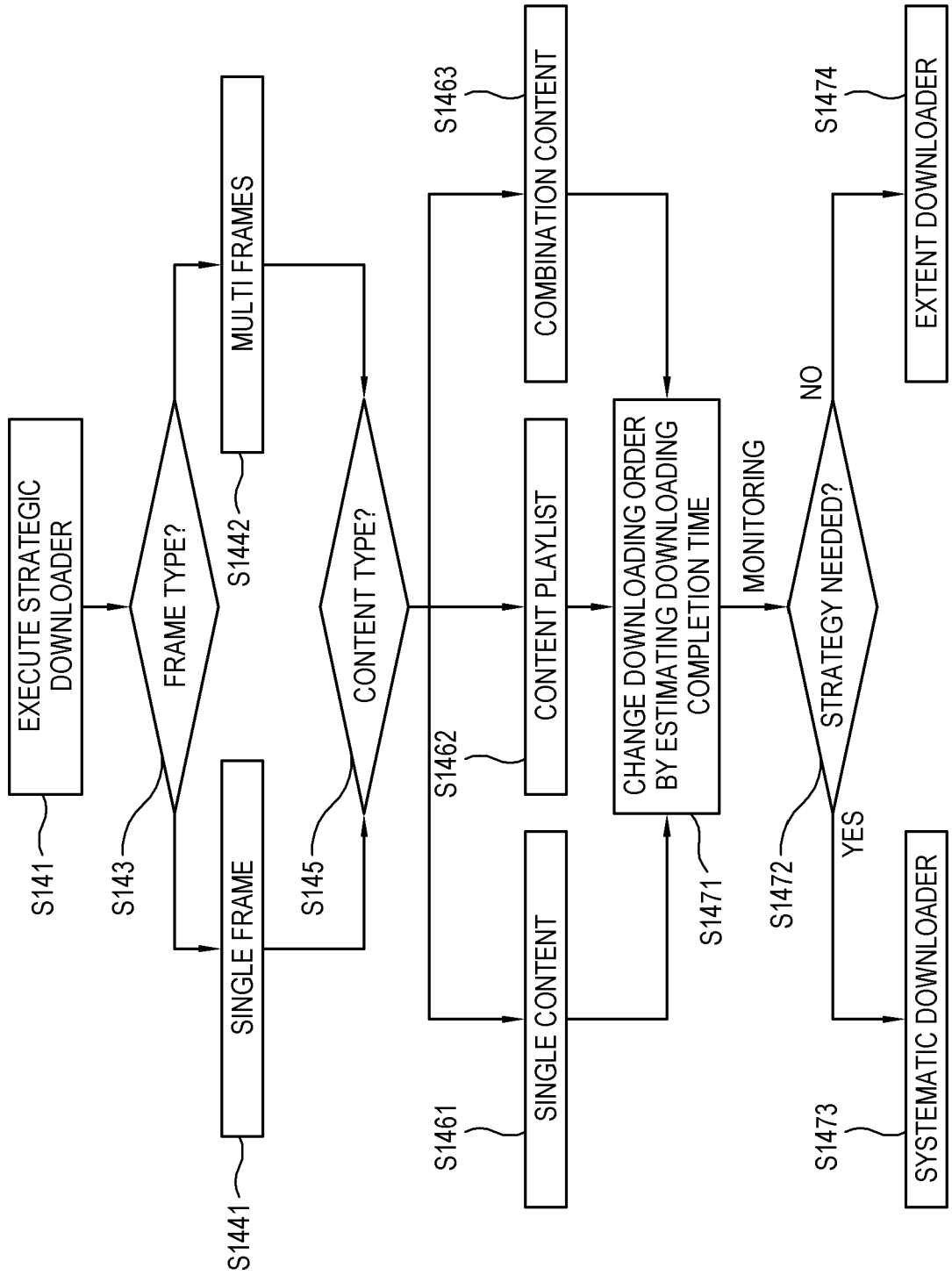
FIG. 13 is a flowchart illustrating downloading content through the strategic downloader according to an exemplary embodiment.

FIG. 13 is a flowchart of downloading content through the strategic downloader according to an exemplary embodiment. As shown in FIG. 13, if the display apparatus 10 according to an exemplary embodiment selects the strategic downloader algorithm as a strategy for downloading content, the strategic downloader is executed at operation S141.

Next, it is determined at operation S143 whether the frame type is a single frame S1441 or a multi frame S1442, and a content type is determined at operation S145 with regard to each case. In this case, it is determined whether the content type is one of single content S1461, a content playlist S1462 and a combination content S1463, and the downloading completion time of the content is estimated to control the downloading order at operation S1471 with regard to each case.

Through continuous monitoring after the operation S1471, it is determined at operation S1472 whether a strategy is needed or not. If the strategy is needed, the strategic downloader is selected at operation S1473. If the strategy is not needed, the extent downloader is selected at operation S1474.

Like this, if the display apparatus 10 according to an exemplary embodiment employs the strategic downloader algorithm as the downloading strategy, the order of downloading the content is adjusted by estimating the downloading completion time, thereby shortening time taken from downloading up to reproducing.

Figure 14:
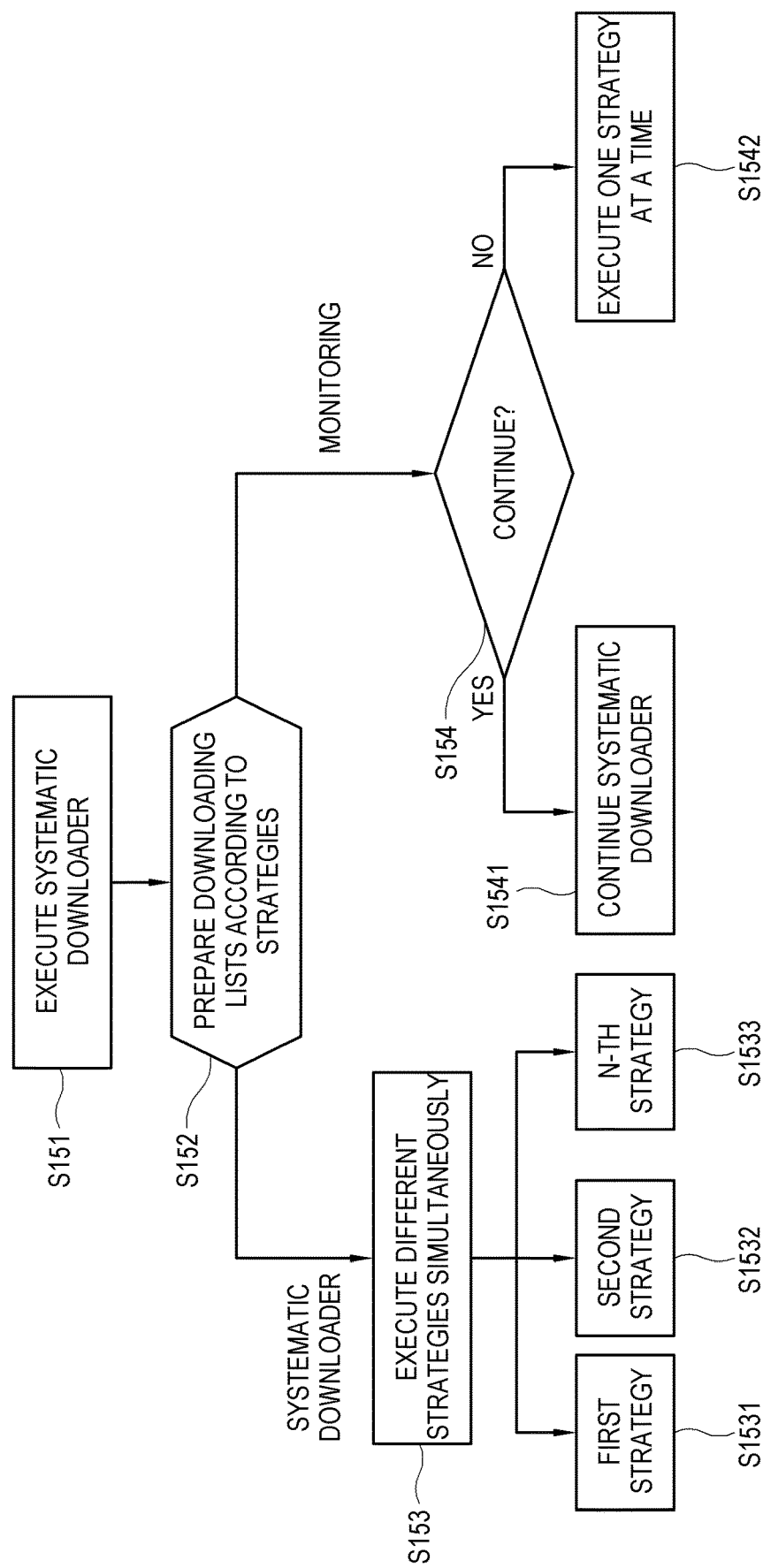
FIG. 14 is a flowchart illustrating downloading content through a systematic downloader according to an exemplary embodiment.

FIG. 14 is a flowchart of downloading content through a systematic downloader according to an exemplary embodiment. As shown in FIG. 14, if the display apparatus 10 according to an exemplary embodiment employs the systematic downloader algorithm as the strategy for downloading the content, the systematic downloader is executed at operation S151. The systematic downloader employs strategic downloader algorithms different according to the plurality of channels or the plurality of frames.

Next, downloading lists according to strategies are prepared at operation S152. That is, the display apparatus 10 grasps a content downloading list, to which each of the strategic downloaders different according to the plurality of channels or the plurality of frames is applied, based on the schedule file distributed from the external device 19.

Next, based on the downloading lists according to the strategies prepared in the operation S152, the strategic downloaders different according to the plurality of channels or the plurality of frames are simultaneously executed at operation S153. According to an exemplary embodiment, the display apparatus 10 displays areas corresponding to the plurality of frames on a screen, and executes a first strategy S1531, a second strategy S1532, . . . , and Nth strategy S1533, which are different from one another, so that the plurality of pieces of content can be reproduced on the corresponding areas as scheduled. Here, the first strategy S1531, the second strategy S1532, . . . , and the N strategy S1533 are executed by a multithreading method of simultaneously downloading many pieces of content according to the plurality of frames.

Through monitoring after the operation S152, it is determined at operation S154 whether the systematic downloader will be continued or not. If it is determined that the systematic downloader is desired to be continued, the systematic downloader is selected at operation S1541. Otherwise, one strategic downloader is executed at a time at operation S1542.

Like this, if the display apparatus 10 according to an exemplary embodiment employs the systematic downloader algorithm as the downloading strategy, the strategic downloaders different according to the plurality of channels or the plurality of frames are simultaneously executable. Thus, if the content is downloaded according to the plurality of channels or the plurality of frames, it speed of downloading the content is improved.

Figure 15:
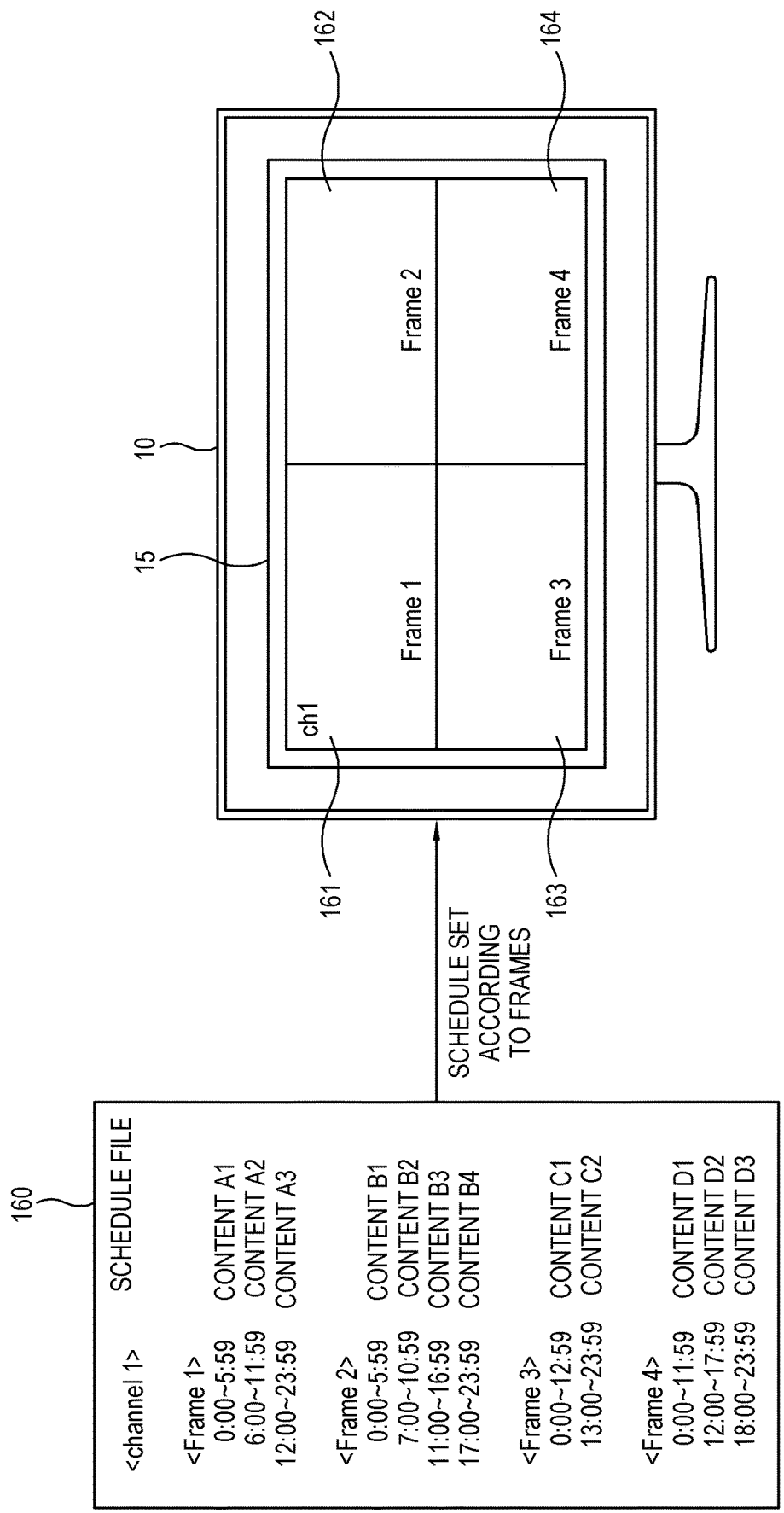
FIG. 15 is a view illustrating reproducing content according to frames on a screen based on a schedule according to an exemplary embodiment.

FIG. 15 illustrates an example of reproducing content according to frames on a screen based on a schedule according to an exemplary embodiment. As shown in FIG. 15, the display apparatus 10 according to an exemplary embodiment downloads and reproduces content according to the plurality of frames 161, 162, 163, and 164 based on the schedule file 160 distributed from the external device 19. Here, the schedule file 160 may include reproduction schedule information of content according to a plurality of frames with respect to one channel.

According to an exemplary embodiment, the display apparatus 10 displays areas corresponding to a first frame 161, a second frame 162, a third frame 163, and a fourth frame 164 on the display 15, and reproduces a plurality of pieces of content in the areas according to the set schedules.

In this case, the schedule file 160 includes information about the reproduction schedule of the plurality of pieces of content with regard to the first frame 161, the second frame 162, the third frame 163, and the fourth frame 164 for a channel 1. For example, content A1 is set to be reproduced from time 0:00 to time 5:59, content A2 is set to be reproduced from time 6:00 to time 11:59, and content A3 is set to be reproduced from time 12:00 to time 23:59 with regard to the first frame 161. Likewise, the reproduction schedules for the pieces of content are set with regard to each of the second frame 162, the third frame 163, and the fourth frame 164 in the schedule file 160.

Thus, if the reproduction schedules for the pieces of content are set in the schedule file 160 distributed from the external device 19 with regard to each of the plurality of frames, the display apparatus 10 may use different downloading strategies according to the frames. Further, the downloading strategies for the plurality of frames are simultaneously performed, thereby having an effect on enhancing the speed of downloading the content.

Figure 16:
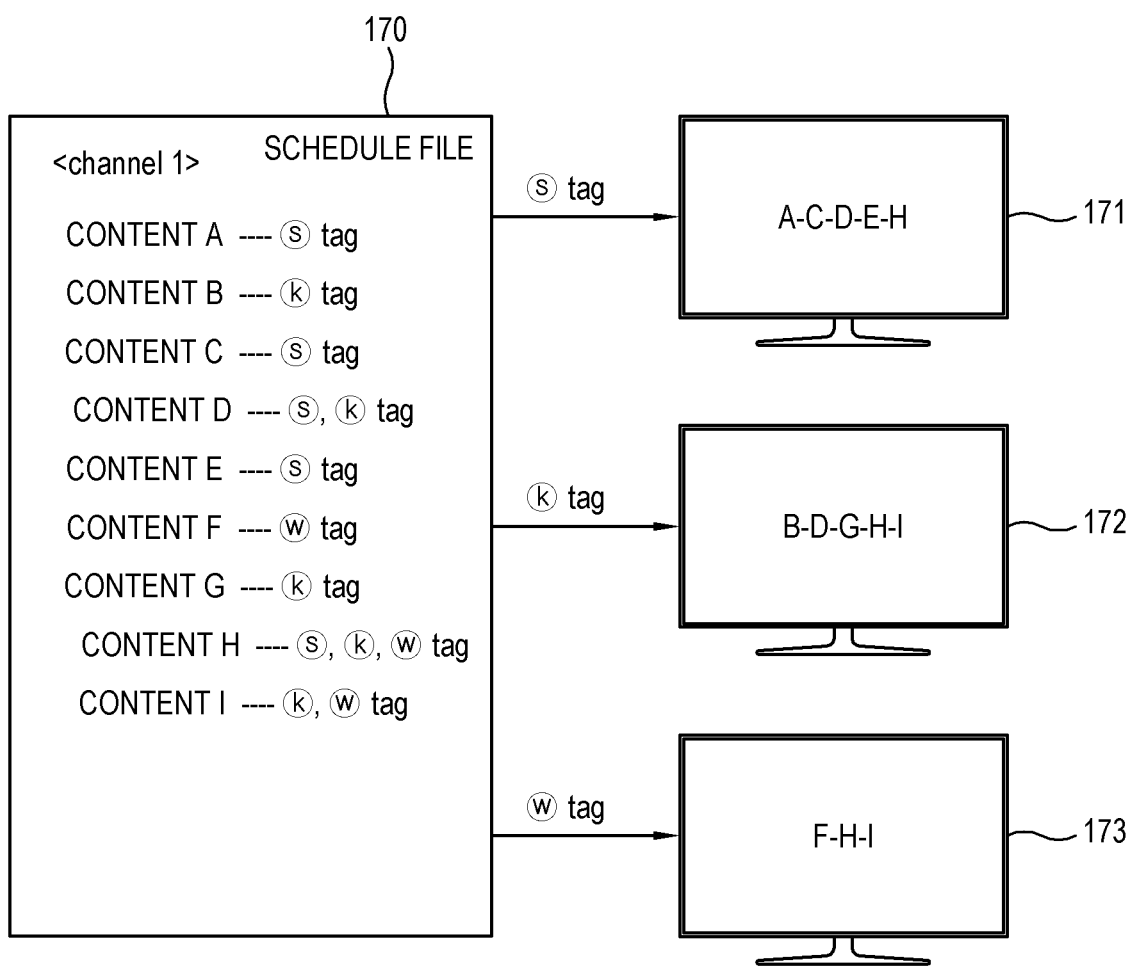
FIG. 16 is a view illustrating reproducing content in a plurality of apparatuses based on a schedule according to an exemplary embodiment.

FIG. 16 illustrates an example of reproducing content in a plurality of apparatuses based on a schedule according to an exemplary embodiment. As shown in FIG. 16, display apparatuses 171, 172, and 173 according to an exemplary embodiment downloads and reproduces content based on a schedule file 170 distributed from the external device 19. Here, the schedule file 170 includes reproduction schedule information about content corresponding to one channel, and apparatus information with regard to each piece of content.

In the schedule file 170 according to an exemplary embodiment, apparatus information is set with tags with regard to each piece of content for the channel 1. For example, an ⓢ tag is set with regard to the content A, a ⓚ tag is set with regard to the content B, the ⓢ tag is set with regard to the content C, the ⓢ tag and ⓚ tag are set with regard to the content D, a ⓦ tag is set with regard to the content F, and so on. In this case, the ⓢ tag, the ⓚ tag, and the ⓦ tag are respective setting values for a first display apparatus 171, a second display apparatus 172, and a third display apparatus 173.

In accordance with the apparatus information set in the schedule file 170, the first display apparatus 171 downloads and reproduces content A-C-D-E-H, the second display apparatus 172 downloads and reproduces content B-D-G-H-I, and the third display apparatus 173 downloads and reproduces content F-H-I. In this case, the display apparatuses 171, 172, and 173 may simultaneously use different downloading strategies to download pieces of content selected by the apparatus information.

Figure 17:
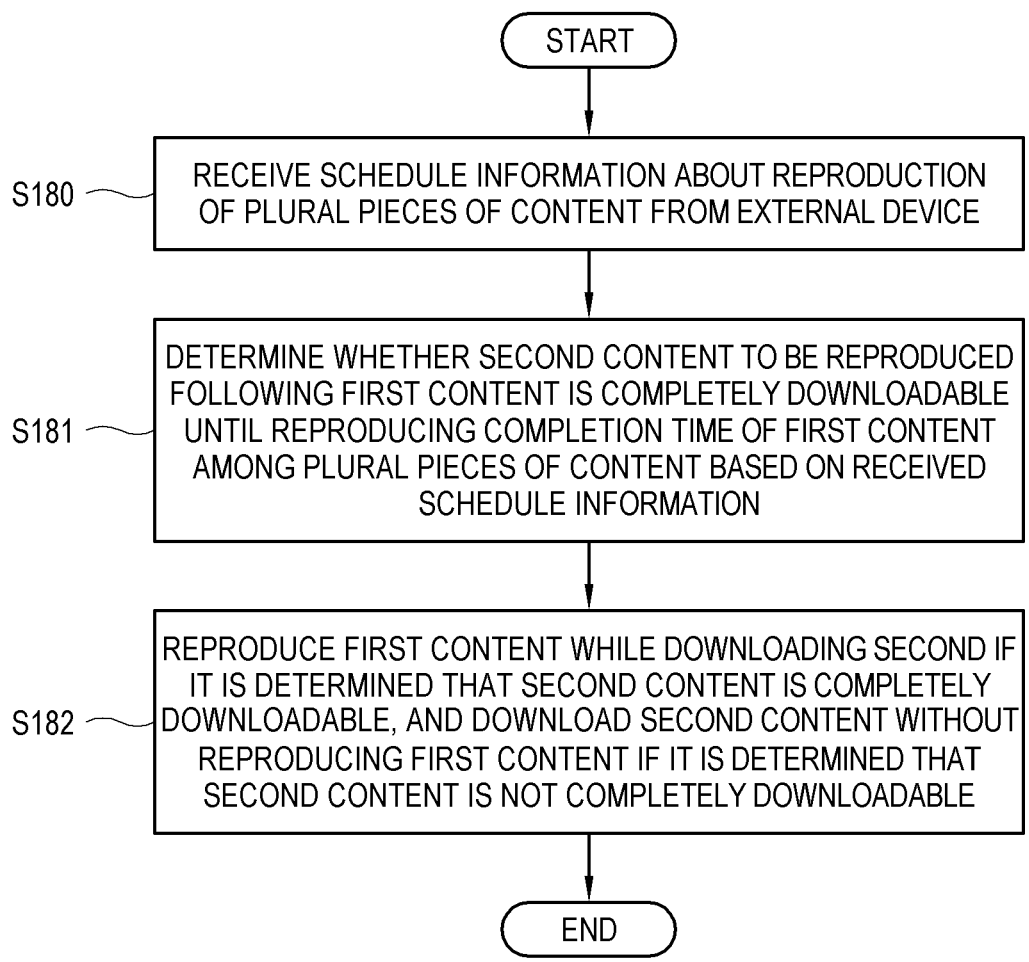
FIG. 17 is a flowchart illustrating controlling a display apparatus according to an exemplary embodiment.

FIG. 17 is a flowchart of controlling a display apparatus according to an exemplary embodiment. As shown in FIG. 17, the display apparatus 10 according to an exemplary embodiment first receives schedule information about reproduction of a plurality of pieces of content from an external device at operation S180. Here, the schedule information includes information about reproduction channels corresponding to the plurality of pieces of content, at least one frame set according to the reproduction channels, content types, each reproduction section set for the plurality of pieces of content, etc. The content type includes at least one of single content, a content playlist, and combination content where various types of content are combined.

According to an exemplary embodiment, there may be provided an operation of reproducing the plurality of pieces of content on the display 15 according to the set schedules, based on the information about the reproduction channel included in the schedule information. Further, there may be provided an operation of displaying an area corresponding to at least one frame on the display 15 based on the information about the frames according to the reproduction channels included in the schedule information, and an operation of reproducing at least one content set with regard to a corresponding frame on each area as scheduled.

Next, at operation S181, it is determined based on the received schedule information whether the second content to be reproduced following the first content is completely downloadable among the plurality of pieces of content until the reproducing completion time of the first content.

Last, at operation S182, if it is determined that the second content is completely downloadable, the second content is downloaded during the reproduction of the first content. If the second content is not completely downloadable, the second content begins to be downloaded without reproducing the first content.

According to an exemplary embodiment, there may be provided an operation of determining whether the first content is completely downloadable during the first section set for reproducing the first content based on the schedule information if the schedule information is received, and an operation of downloading the first content during the first section if it is determined that the first content is completely downloadable but downloading the second content during the first section if it is determined that the first content is not completely downloadable.

In this case, there may be further provided an operation of reproducing the previously set default content instead of the first content during the first section if the first content is not completely downloadable during the first section based on the schedule information.

According to an exemplary embodiment, there may be provided an operation of determining whether the second content and the third content subsequent to the second content are completely downloadable until the reproducing completion time of the first content based on the schedule information, and an operation of simultaneously or sequentially downloading the second content and the third content during the reproduction of the first content if it is determined that the second content and the third content are completely downloadable.

According to an exemplary embodiment, there may be provided an operation of determining at least one piece of content completely downloadable among the plurality of pieces of content set to be subsequently reproduced in sequence until reproducing completion time of the first content based on the schedule information, and an operation of downloading at least one piece of content during the reproduction of the first content.

As described above, according to an exemplary embodiment, it is possible to shorten time from downloading to reproducing in terms of downloading the plurality of pieces of content.

Further, according to an exemplary embodiment, it is possible to provide the most efficient downloading method by selectively using various strategies in terms of downloading the plurality of pieces of content.

Although a few exemplary embodiments have been shown and described, it will be appreciated by those skilled in the art that changes may be made in exemplary embodiments without departing from the principles and spirit of an inventive concept, the scope of which is defined in the appended claims and their equivalents. All differences within the scope will be construed as being included in the present disclosure.

What is claimed is:

1. A display apparatus comprising:
   a communicator;
   a display; and
   a controller configured to:
   receive schedule information about reproduction of a plurality of pieces of content from an external device via the communicator,
   identify first content to be first reproduced from among the plurality of pieces of content based on the received schedule information,
   identify whether second content to be reproduced following the first content from among the plurality of pieces of content is downloadable before a completion time of a first section in which the first content is set to be reproduced, based on the received schedule information,
   based on identifying that the second content is downloadable, download the second content while the display reproduces the first content, and
   based on identifying that the second content is not downloadable, initiate downloading of the second content without the display reproducing the first content.

2. The display apparatus according to claim 1, wherein the controller is further configured to:
   identify whether the first content is fully downloadable during the first section based on the schedule information,
   based on identifying that the first content is fully downloadable during the first section, download the first content to be reproduced by the display, and
   based on identifying that the first content is not fully downloadable during the first section, skip the downloading of the first content and download the second content during the first section.

3. The display apparatus according to claim 2, wherein the controller is further configured to control the display to reproduce a preset default content instead of the first content during the first section based on the controller determining that the first content is not fully downloadable during the first section.

4. The display apparatus according to claim 1, wherein the controller is further configured to:
   identify whether the second content and third content from among the plurality of pieces of content, which is a piece of content to be reproduced following the second content, are fully downloadable before the completion time of the first section based on the schedule information, and
   based on the controller determining that the second content and the third content are fully downloadable, simultaneously or sequentially download the second content and the third content while the display reproduces the first content.

5. The display apparatus according to claim 1, wherein the controller is further configured to identify at least one piece of content that is fully downloadable from among the plurality of pieces of content that are set to be subsequently reproduced in sequence until the completion time of the first section based on the schedule information, and download the at least one piece of content identified by the controller while reproducing the first content.

6. The display apparatus according to claim 1, wherein the schedule information comprises information about a plurality of reproduction channels comprising the plurality of pieces of content, at least one frame set according to the reproduction channels, content types, and a reproduction section set for each of the plurality of pieces of content.

7. The display apparatus according to claim 6, wherein the controller is further configured to control the display to reproduce the plurality of pieces of content according to set schedules based on the information about the reproduction channels.

8. The display apparatus according to claim 6, wherein the controller is further configured to control the display to display an area corresponding to each of at least one frame based on information about frames according to the reproduction channels, and control the display to reproduce at least one piece of content set with regard to a corresponding frame in each area.

9. The display apparatus according to claim 6, wherein the content type comprises at least one from among a single content, a content playlist, and a combination content in which various types of content are combined.

10. A method of controlling a display apparatus, the method comprising:
    receiving schedule information about reproduction of a plurality of pieces of content from an external device, wherein the plurality of pieces of content comprises a first content and a second content;
    identifying the first content to be first reproduced from among the plurality of pieces of content based on the received schedule information;
    identifying whether the second content to be reproduced following the first content is downloadable before a completion time of a first section in which the first content is set to be reproduced, based on the received schedule information;
    based on identifying that the second content is downloadable, downloading the second content while reproducing the first content; and
    based on identifying that the second content is not downloadable, starting downloading the second content without reproducing the first content.

11. The method according to claim 10, further comprising:
    receiving the schedule information from the external device;
    identifying whether the first content is fully downloadable during the first section based on the received schedule information;
    based on identifying that the first content is fully downloadable during the first section, downloading the first content; and
    based on identifying that the first content is not fully downloadable during the first section, downloading the second content during the first section.

12. The method according to claim 11, further comprising:
    reproducing a preset default content instead of the first content during the first section based on the determining that the first content is not fully downloadable during the first section.

13. The method according to claim 10, further comprising:
    identifying whether the second content and third content, from among the plurality of pieces of content and which is to be reproduced following the second content, are fully downloadable before the completion time of the first section, based on the schedule information; and
    based on the determining that the second content and the third content are fully downloadable, simultaneously or sequentially downloading the second content and the third content while reproducing the first content.

14. The method according to claim 10, further comprising:
    identifying at least one piece of content fully downloadable prior to the completion time of the first section, wherein the at least one piece of content is from among the plurality of pieces of content which are set to be subsequently reproduced in sequence, based on the schedule information; and
    downloading the identified at least one piece of content while reproducing the first content.

15. The method according to claim 10, wherein the schedule information comprises information about reproduction channels comprising the plurality of pieces of content, at least one frame set according to the reproduction channels, content types, and a reproduction section set for each of the plurality of pieces of content.

16. The method according to claim 15, further comprising reproducing the plurality of pieces of content on a display according to set schedules based on the information about the reproduction channels.

17. The method according to claim 15, further comprising:
    displaying an area corresponding to each of at least one frame on a display based on information about frames according to the reproduction channels; and
    reproducing at least one piece of content set with regard to a corresponding frame in each area.

18. The method according to claim 15, wherein the content type comprises at least one from among a single content, a content playlist, and a combination content in which various types of content are combined.

19. A computer program product comprising:
    a memory configured to store instructions; and
    a processor, wherein the instructions, when executed by the processor, cause a display device:

to receive schedule information about reproduction of a plurality of pieces of content from an external device, to identify first content to be first reproduced from among the plurality of pieces of content based on the received schedule information;

to identify whether second content to be reproduced following the first content from among the plurality of pieces of content is downloadable before a completion time of a first section in which the first content is set to be reproduced, based on the received schedule information, based on identifying that the second content is downloadable, to download the second content while the display reproduces the first content, and based on identifying that the second content is not downloadable, to initiate downloading of the second content without the display reproducing the first content.

* * * * *